US009862126B2

(12) United States Patent
Mullininx et al.

(10) Patent No.: US 9,862,126 B2
(45) Date of Patent: Jan. 9, 2018

(54) METHOD AND APPARATUS FOR FORMING OBJECTS HAVING A CORE AND AN OUTER SURFACE STRUCTURE

(71) Applicants: Richard B. Mullininx, Savannah, GA (US); P. Alan Whiten, Savannah, GA (US)

(72) Inventors: Richard B. Mullininx, Savannah, GA (US); P. Alan Whiten, Savannah, GA (US)

(73) Assignee: GREAT DANE LLC, Chicago, IL (US)

( * ) Notice: Subject to any disclaimer, the term of this patent is extended or adjusted under 35 U.S.C. 154(b) by 587 days.

(21) Appl. No.: 14/220,045

(22) Filed: Mar. 19, 2014

(65) Prior Publication Data
US 2015/0266215 A1 Sep. 24, 2015

(51) Int. Cl.
*B29C 44/12* (2006.01)
*B29C 44/38* (2006.01)
*B29K 75/00* (2006.01)
*B29L 9/00* (2006.01)

(52) U.S. Cl.
CPC ........ *B29C 44/1233* (2013.01); *B29C 44/388* (2013.01); *B29K 2075/00* (2013.01); *B29L 2009/00* (2013.01)

(58) Field of Classification Search
None
See application file for complete search history.

(56) References Cited

U.S. PATENT DOCUMENTS

| 3,014,611 | A | 12/1961 | Marshall |
| 3,963,395 | A | 6/1976 | Bourdo |
| 4,012,186 | A | 3/1977 | Ramazzotti et al. |
| 4,021,981 | A | 5/1977 | Van Wagoner |
| 4,030,870 | A | 6/1977 | Bunce |
| 4,743,485 | A | 5/1988 | Ting |
| 5,021,108 | A | 6/1991 | Bergqvist |

(Continued)

FOREIGN PATENT DOCUMENTS

| CA | 2182553 | 2/1997 |
| EP | 0539407 | 8/1994 |

(Continued)

OTHER PUBLICATIONS

Salvagnini P4, Verco Chills Out with Energy-Efficient Panel Bender, Metalworking Production, May 2003, p. 12, centaur Communications Ltd., London, United Kingdom.

(Continued)

*Primary Examiner* — Monica Huson
(74) *Attorney, Agent, or Firm* — Nelson Mullins Riley & Scarborough LLP

(57) ABSTRACT

A method of making at least partially foam-filled sandwich panels includes providing a panel shell, moving at least one of a portion of a first and/or second panel facer or a side member away from the panel volume, thereby defining an opening between the volume and an exterior area. A dispenser proximate the opening moves across at least a portion of the opening while dispensing an amount of a foam agent into the volume through the opening. A press has three platens, a third platen of which is secured to at least one of a portion of the first and/or second facer and the at least one side member and is moveable with respect to the first platen and the second platen in response to a control system.

21 Claims, 15 Drawing Sheets

(56) References Cited

U.S. PATENT DOCUMENTS

| | | | |
|---|---|---|---|
| 5,107,649 | A | 4/1992 | Benson et al. |
| 5,351,990 | A | 10/1994 | Thomas |
| 5,366,574 | A | 11/1994 | Lenhardt et al. |
| 5,507,405 | A | 4/1996 | Thomas et al. |
| 5,772,276 | A | 6/1998 | Fetz et al. |
| 6,393,855 | B1 | 5/2002 | Schuchert et al. |
| 6,607,237 | B1 | 8/2003 | Graaff et al. |
| 7,011,358 | B2 | 3/2006 | Graaff et al. |
| 7,025,408 | B2 | 4/2006 | Jones et al. |
| 7,258,391 | B2 | 8/2007 | Graaff et al. |
| 7,901,537 | B2 | 3/2011 | Jones et al. |
| 8,523,304 | B2 | 9/2013 | Kim |
| 2003/0071486 | A1 | 4/2003 | Graaff et al. |
| 2005/0037180 | A1 | 2/2005 | Korosy et al. |
| 2012/0326587 | A1 | 12/2012 | Jeong et al. |
| 2013/0195544 | A1 | 8/2013 | Sanders et al. |
| 2013/0207413 | A1 | 8/2013 | Lookebill et al. |

FOREIGN PATENT DOCUMENTS

| | | |
|---|---|---|
| EP | 1174333 A2 | 1/2002 |
| EP | 2422033 | 2/2013 |
| GB | 2275327 A | 8/1994 |
| KR | 100257166 | 5/2000 |
| WO | 8900265 | 1/1989 |
| WO | 9406992 | 3/1994 |
| WO | 2008056246 | 5/2008 |

OTHER PUBLICATIONS

International Search Report and Written Opinion dated Jun. 8, 2015 from International application No. PCT/US2015/021337.

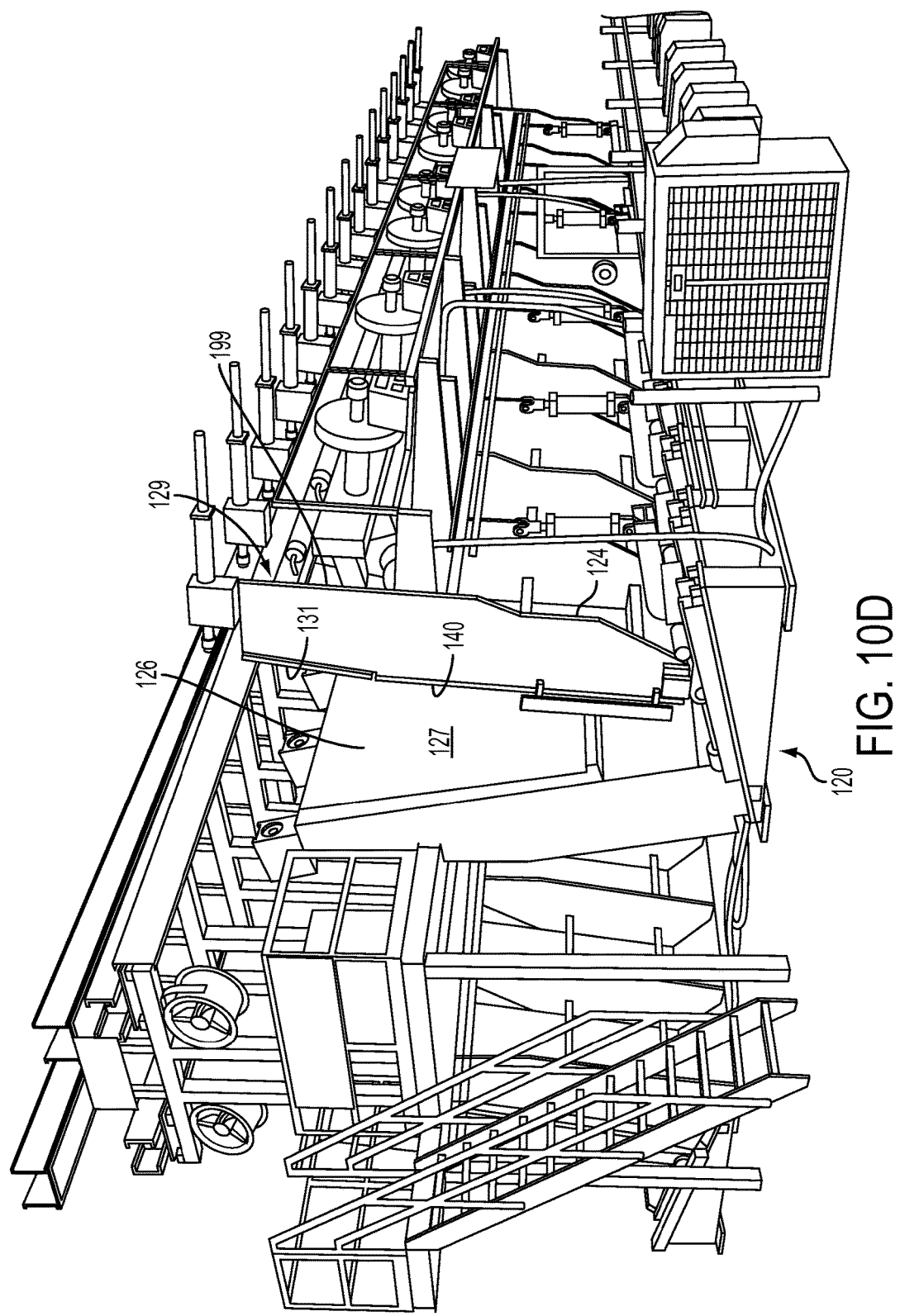

METHOD AND APPARATUS FOR FORMING OBJECTS HAVING A CORE AND AN OUTER SURFACE STRUCTURE

BACKGROUND OF THE PRESENT INVENTION

The present invention relates to foamed sandwich objects, such as but not limited to sandwich panels having opposing facers between which a core is disposed, and in particular methods and apparatus for manufacturing such objects.

Insulated structures, for example buildings, containers, truck bodies and trailers, may be constructed utilizing insulated sandwich panels having two major surfaces and four minor side surfaces. The side surfaces are "minor" in that they encompass the panel's shortest dimension, whereas the facers encompass the panel's largest dimensions. The ratio between the largest and the shortest dimensions is such that the panels may be considered generally planar. The facers are formed of solid materials, such as aluminum or other metals, polymers, or wood, that may exhibit flexibility in response to forces in the panel's shortest dimension but rigidity in the plane defined by the other two dimensions. Between the two facers is an insulating foam. The facers are generally strong and stiff as compared to the foam core, which is of lighter weight and lower density than the facers. The foam core provides structural support, e.g. resisting shear stresses and deflection, and it may provide thermal insulation.

Insulated sandwich panels may include various structures in the interior volume between the facers that is otherwise filled by the foam, for example vertical or horizontal support posts or ribs that attach to and extend between the inner and outer facers or that attach to just one of the facers. Electrical conduit lines may run through the panel, and troughs or raceways may be provided in the panel facers, attached to and opening through one of the facers, to provide a path for the conduit lines. Wooden or plastic blocks or other structures may be disposed in the volume, extending between the facers, to provide a structure into which screws or nails may be driven as objects (such as logistics tracks) are attached to the sandwich panel facer before or after assembly. Particularly where a panel is used in the roof of the insulated structure, lighting or other electrical fixtures may be secured in the panel within the volume and extend through a hole made in the facer to receive the fixture. These holes may be provided with tape or weather stripping as a seal between the facer hole and the fixture, or trough, to prevent foam leaks and otherwise seal the panel interior.

Various types of foam may be used to form insulated sandwich panels. In typical two-part insulating foams, two monomers react to form a longer chain polymer, releasing gas in the reaction that becomes trapped in closed cells that, in turn, form the foam structure. The trapped gas has a low thermal conductivity, and thus acts as the insulating agent, while the foam cell walls provide the foam's structural characteristics. The volume ratio of gas to solid cell structure is large.

Polyurethane foams, which are commonly used in insulated sandwich panels, are formed from the combination of a polyol and an isocyanate. The isocyanate is generally consistent among polyurethane foams, the variability of which is attributable primarily to the polyol. The polyol's selection generally determines a given polyurethane foam's in place density, its thermal properties, and the timing or reactivity at which the components react to generate foam and subsequently cure.

In so-called spray foam applications, for example, the polyol is chosen so that when the polyol and the isocyanate come together at a foam sprayer head, the resulting liquid or semi-liquid foam agent has a consistency such that the foam agent clings well to vertical surfaces. The reaction rate is slow enough to allow a user to spray a relatively large area before foaming begins or reaches a point at which foaming interferes with the foam's application to desired surfaces. Typically, a panel to be insulated by spray foam would be initially constructed with one facer, the short-side structures and the internal structures, if any, but without the opposing facer. That is, the panel is open at one of its two major sides. The user then sprays the panel's interior volume. Because of the foaming agent's tendency to cling to the sprayed surface, and the agent's relatively slow reaction rate, the user can adequately fill the panel volume, including irregularly-shaped spaces within the volume, if any, before foaming begins or before enough foam expands to inhibit the spray's effective deposition. The user can then place and secure the opposing facer onto the panel's open major side before the foam expands, thereby enclosing the panel interior volume. The sprayed foam then completely expands or rises and thoroughly fills the panel volume. As should be understood, vent slits or holes may be provided in the short sides or facers as necessary to allow the escape of gases as the foam fills the volume. The vent holes may be covered with gas permeable filter material that allows the escape of air or other gases but that blocks passage (leakage) of foam.

Because it is necessary to expose the entirety of the panel volume in order to apply foam by spraying, spray-foamed panels are opened for foaming at one of the facer sides, rather than at one of the short sides. This means, however, that the omitted facer cannot have mechanical or sealed attachments or engagements to interior structures within the panel that would otherwise require the facer's assembly to such structure prior to foaming. Accordingly, while spray foaming is utilized in insulating panels having relatively simple internal structures, for instance those used in buildings, such methods are often unsuitable for insulating panels having more complicated internal structures, for example those used in vehicles.

It is also known to foam sandwich panels through open-pour methods, in which a panel shell that is enclosed on five sides, but open at one of its major sides (e.g., a vacuum element in a press can secure or hold one of the facers and facilitate temporary removal of the second facer from the shell), is moved on a conveyor relative to a foam dispensing head. The open panel shell can be moved along a conveyor system under an elongated dispensing head that extends across the panel's width so that as the panel moves under the dispensing head, the dispensing head deposits liquid for semi-liquid foam agent into the panel's interior. After passing under the dispensing head, the panel shell can be shuttled into a press mechanism, the bottom facer of the open panel shell being received on a platen of the press. An opposing platen holds the other facer (which the platen had earlier removed), for example by suction, opposite the shell's open major side. The press moves the second platen down onto the shell, so that the removed facer again engages the panel shell sides, thereby enclosing the panel's internal volume. The mixed foam agent's chemistry is such that the foam does not rise to fill the volume before the opposing facer is placed down onto the open shell. The press then applies sufficient force to the platens, in opposition to the outward force that the expanding foam applies as the foam agent exotherms. As should be understood, a combination of aluminum or plastic extrusions and wood or polymer strips or blocks may be placed along the panel edges to construct the short sides and maintain the foam within the side surfaces. The press mechanism generally does not provide platens to apply resistive pressure to the side surfaces. Rather, the pressure applied by the major-side platens compresses or pinches, without crushing, the side members between the facers, holding them in place sufficiently to resist the foam's outward pressure. Again, vents may be provided in the side members to allow air and other gases to escape as foam fills the panel volume, and semi-permeable filter material may be placed over the vents to block the interior foam's escape.

As with spray foaming methods, open pour methods require a facer's removal, thus precluding use with foam panels that have internal structures that would require attachment prior to foaming.

It is also known to pre-form insulation foam into blocks, cut the block foam into desired shapes to fit a panel interior, and then secure the one or more resulting foam pieces into the panel. This procedure can accommodate complicated interior panel volumes but tends to limit a panel's thermal performance. When a foam agent is allowed to react and foam within an enclosed volume, and when there is sufficient foam agent such that the resulting foam fills the volume and exerts pressure against its sides, the restricted enclosure increases foam density and tends to promote a more uniform cell structure. This, in turn, generally improves the foam's thermal characteristics. Block-formed foam, however, is formed within a structure that may be bounded on some, but not all, sides, thereby allowing the foam to rise freely, with the foam's weight being its primary restriction. This results in a cell density lower than, and a cell structure more irregular than, foam that is formed in a confined volume. Even if the foam to be cut is formed in a completely enclosed cavity, the subsequent cutting operation allows cell gases to escape and degrades the ability of the cut blocks to insulate effectively. Heavy or high density Styrofoam, for example, may have a density in the range of 2.1-2.5 pounds per cubic foot. Furthermore, block urethane foam tends to shrink for some period after initial curing. Thus, block-formed urethane foam cannot be used immediately after its formation and must be allowed to rest for some intervening period of time. During this time, however, the foam can experience some degree of loss of foam cell gas (outgassing), further impairing the foam's thermal performance. Finally, while block foam may be cut to closely fit a panel's internal structure, the fit is not as close as that resulting from foam that is initially inserted into the panel as a pre-expanded or foamed liquid and allowed to rise to fill and fill the panel's interior. While adhesives may be used to fill gaps around, and otherwise secure, block foam within a panel, the adhesive generally has a lower thermal performance than the foam and adds weight and cost. The formation of sandwich panels using block foam can also be labor intensive.

Where an insulated sandwich panel includes interior structure that interacts with the facers or external elements that attach to or through the facers, it is known to insert the foam by injection of pre-foam or semi-foamed liquid into an enclosed panel volume. The sandwich panel shell is generally first constructed so that the two facers and the separating side members completely enclose the panel's interior volume and, therefore, the panel's interior structures. One or more holes is drilled or otherwise formed in one or both facers and/or a side member. A user places a foam injection nozzle at a hole and injects liquid or semi liquid (froth) foam agent into the enclosure. One such hole may be sufficient for a small panel, but larger panels may require multiple interior enclosures or segments, sometimes referred to as cavities, and corresponding foam access holes. Accordingly, it is known to divide a panel's interior volume into discrete segments or cavities that are sealed from each other with respect to the foam. Respective holes are drilled to each segment through the side members to provide for foam dispensing and escape of gases from the segment interior. The panel shell is then placed into a press having opposing platens that abut the facers and possibly including a fixed position perimeter board or mold board abutting and supporting the short sides to resist the forces resulting from the core material's expansion. The platens apply opposing pressure to the facers, again pinching the side members to hold them in place. The access holes are typically along one of the panel's sides, and the panel is generally installed in the press so that this side faces upward, or at least oriented such that this side is exposed to an operator working at the press. The foam nozzle is disposed proximate the panel edge on a moveable structure at the press by a counterbalance so that the operator may deploy the nozzle and move the dispensing head and nozzle down the panel's length, sequentially engaging the foam nozzle at the panel shell's access holes to thereby fill the panel's volume.

At the time the panel's layout is designed, the volume of each interior segment can be determined. This information, and the sequence in which the individual segments will be filled, may be provided to a computer that controls the foam machine's operation. The foam machine computer may also be programmed with or has access to the amount of foam agent needed per unit volume in order to result in foam (within a given volume) having the density and cell formation desired for a given panel. Alternatively, all of these calculations can be made outside of the computer programming, so that the computer (including a corresponding database) receives information describing only the number and sequence of foam agent injections to be made for a given panel and the respective amounts of foam agent to be provided in each of the injections.

When the panel shell is placed in the press, an operator initiates the foaming sequence. The operator actuates the press controls to direct the press platens to apply pressure to the opposing shell facers and actuates the foam machine computer to assume the beginning of the injection sequence. For the latter step, the operator places the foam injection nozzle at the access hole for the first volume segment in the sequence (the first hole, at one end of the panel edge) and actuates the trigger. This causes a signal to be received at the foam machine computer, and the computer correspondingly controls fluid valves and pumps from the polyol and isocyanate sources to deliver respective amounts of those substances to the foaming head so that the foaming head mixes and dispenses the predetermined amount of foam agent into the first segment. After the amount of foam agent has been dispensed, the operator removes the dispensing head from the first access hole, moves the dispensing head to the second hole in the sequence, engages the second access hole, and actuates the trigger. This causes the foam machine computer to control the system to deliver the amount of foam agent corresponding to the second volume segment. Generally a second operator follows the first operator, plugging the holes after the liquid foam agent has been deposited into the respective volume segment. This process repeats until corresponding foam agent amounts have been injected into all the panel's interior volume segments.

As noted, the press platens apply pressure to the facers as the operator injects liquid foam agent into panel shell interior. Supports may be provided in the panel interior to provide structure and/or prevent the shell's deformation into the volume. As the foam agent exotherms, i.e., as the foam expands or rises, pressure and temperature build within the panel shell interior. As should be understood in this art, it is desirable to maintain the panel system at a relatively constant temperature range during foaming, and for this purpose the press platens may be provided with a series of fluid paths within each platen. When the platens close upon the non-foamed panel shell, fluid, heated to a pre-determined temperature that is desirable for the foaming process, for example, 110° F., circulates through the platens, warming the facers to approximately the same temperature. As the foam exotherms, however, and as the temperature within the panel rises, the fluid flowing through the platens becomes a cooling agent, carrying heat away from the platens to the temperature control system, which now cools the water to 110° F. The temperature regulation of foam insulated sandwich panels should be well understood in this art. Such procedures may be used with the embodiments of the present invention discussed herein but are not, in and of themselves, part of the present invention and are, therefore not discussed in further detail herein.

As with panels made by a spray foaming and open pour methods, vent holes may be provided in the panel shell facers or sides, with suitable filter material, to allow escape of gases during foam expansion while retaining foam within the panel interior.

Once the foam has risen, and thereby completely filled the panel interior volume, the panel remains in the press for a period of time sufficient to allow the foam to cure. As should be understood in the art, curing is the process by which the foam cross links and the cell structure solidifies into its final form.

As noted, the press is operated in such a way as to maintain the panel at a desired temperature range, for example 110° nominal, or within a range of about 105°-115°. As the facers' temperature increases during initial warming, and, to a lesser extent as the foam agent exotherms and the foam cures, the facer material slightly expands. To avoid wrinkles and other possible deformities in the facer surface, the facers and side members are sealed against each other using a foam tape (e.g. as used in or as common weather-stripping material) that allows some degree of slip or relative movement between these components.

As noted, the opposing pressure from the press, pushing the two facers toward each other and against the side members, holds the facers and the side members to each other during the foam injection and curing process. The foam, in turn, holds these panel surfaces together with the core in the finished panel. In some instances, however, the side members are not intended to be a part of the finished sandwich panel, and the side members can be removed after the panel is removed from the press. This can be accomplished by trimming the post-cured panel or by using side members coated to prevent the foam's adhesion to the side members, thereby facilitating their removal.

Various types of presses can be utilized for enclosed injection foaming Referring, for example, to FIG. 1, a mandrel press 10 comprises a three-sided press having a cantilevered inner portion 12 upon which three inner platens 14 are disposed. Opposite inner portion 12 are two outer clamshell portions 16, each having one side platen 18 and a top platen half 20. Press 10 is designed for use in manufacturing insulated panels which are a part of insulated semi-trailers. Prior to injecting the foam insulation, the panel shells for the trailer's sides and roof are constructed and assembled onto a semi-trailer chassis. As described above, the panel shells comprise opposing facers with side members extending around the panel edges to thereby completely enclose the panel shell interior volume. Each panel may be a continuous structure extending the entire length of the trailer, or the trailer may be formed by connecting multiple discrete panel segments in each of the two sides and the roof. Regardless of such arrangement, each panel shell has interior structures, and each panel's interior volume is generally divided into discrete segments. Each side panel has a top rail portion and a bottom rail portion, whereas the roof panel has top rail portions on each longitudinal side. The side panel top rail portions connect to the roof panel top rail portions to secure the panels together. Access holes are drilled in the top rail portions of the side panels in communication with respective interior volume segments so that the holes are accessible from the top of the trailer when the trailer body is assembled. Access holes to the roof panel interior volume segments are also drilled into one of the top rail portions, but these holes are accessible from the side of the roof panel when the panels are assembled onto the trailer chassis. Once the panels are assembled onto the chassis, the nearly-formed trailer (the trailer's rear frame and doors are not yet assembled) is backed up to press 10 while side structures 16 are pivoted outward, as shown in FIG. 1. The trailer's rear opening is backed up to and over central cantilevered press portion 12 so that press portion 12 extends into the trailer's interior and so that respective platens 14 face the trailer's side panels and roof panel. Clamshell side press portions 16 are then pivoted inward toward the trailer so that the top edges of the side portions meet. Central portion 12 is expanded and side platens 18 contracted to oppose the outer portion of the trailer side panels, and ultimately platen surface 20 oppose the outer portion of the roof panel. The inner and outer platens apply pressure to their respective panel surfaces. Press 10 includes a series of holes that align with the access holes in the panels. An operator may then insert a foam head nozzle through the holes in the press, engage a corresponding access hole in one of the panel shells, and begin injection of foam agent into a corresponding panel interior volume segment. Once the foam has been deposited, expands, and cures, outer portions 16 are opened, the trailer shell is removed from the press, and the trailer's construction is completed.

It is also known to manufacture the panels individually, prior to their installation in a trailer. Referring to FIG. 2, for example, a press 22 includes two individual press portions 24 on each side of a central frame. Each press portion 24 includes an inner platen 26 and outer platen 28 that can be pivoted toward and away from platen 26 by actuation of a series of hydraulic pistons 30. A panel shell constructed as discussed above is inserted between platens 26 and 28. Cylinders 30 close platen 28 onto the panel shell so that the panel shell is held securely between the two platens, and pressure is applied. The holes in one of the panel's side members, which provide access to the panel's interior volume segments, are on the side of the press facing upward and are thereby accessible to a user operating the foam injection nozzle from a catwalk above the platens in the central frame.

It is also known to arrange a press so that the platens are disposed horizontally. The assembled panel shell is inserted into the press between the platens so that the facers are also aligned horizontally against the respective platens and so that the side edge in which the access holes are defined is vertically aligned. The foam agent is therefore injected into the respective spaces in a horizontal direction. One example of a horizontally oriented press is U.S. Pat. No. 5,722,276, the entire disclosure of which is incorporated by reference herein.

Referring to FIG. 3, a six-sided polyhedron panel shell 30 for use in a press system for injecting insulating foam into individual interior shell volume segments includes an aluminum outer facer 32 in the form of a relatively thin, planar sheet. The side of aluminum facer 32 facing inward to the panel's interior volume is first covered with an epoxy, polyester or a similar coating to facilitate foam adherence to the facer, as should be understood. A series of extrusion and strips or blocks 34 are disposed along the four edges of aluminum facer 32 and extend upward therefrom for a short distance (compared to the panel's longitudinal dimension) to form the panel's side members. These side members may be made of any desirable material, for example aluminum, wood or various plastics including plastic foams such as Styrofoam. A series of foam tape segments or adhesives 36 are disposed along both rims of the side members in order to adhere the side members to the aluminum facer and to a polymer laminate inner facer 37 (FIG. 4). As the illustrated panel shell 30 is to be used to form a trailer side panel, an aluminum top rail and aluminum bottom rail are attached to the panel's longitudinal edges. For example, a bottom rail 38 is attached to the side members 34 by a series of rivets 40, adhesive or other suitable means.

Side members 34 enclose a volume 42 adjacent the interior surface of facer 32. Within that volume, a series of elongated reinforcing ribs 44 extends across the interior surface of facer 32 between the top and bottom longitudinal side members 34. Ribs 44 attach to facer 32 and provide structural support thereto. As should be understood, such supports in a non-insulated trailer panel would typically extend entirely between the inner and outer facers and attach to both. In this insulated panel, however, it is desirable to maximize the foam's continuity to thereby optimize the panel's thermal characteristics, and lower profile ribs 44 are used instead of fully-extending posts. It should also be understood, however, that J-shaped and Z-shaped posts may also be used in insulated panels, extending entirely between the two facers.

A series of wooden or polymer blocks 46 may be disposed adjacent respective ribs 44 and abut the bottom longitudinal side member 34, just above bottom rail 38, so that blocks 46 extend in a row along the bottom of the panel shell. Upon installation of the inner liner facer, which will abut blocks 46, the blocks provide a backing surface so that a scuff band may be disposed on the side of the inner facer opposite the blocks, and may be secured to the panel at that position by screws extending through the scuff band, the inner facer, and into blocks 46 or alternatively through blocks 46 and into ribs 44. A similar row of blocks are also attached to ribs 44 and extend in a line parallel to the longitudinal side members 34 and extending through the middle of the panel. A similar row of blocks 50 extend longitudinally through the panel near the panel top. The polymer inner liner facer also abuts these blocks, which provide support for the attachment of longitudinal logistics tracks that extend along the panel's length on the inner side. Referring also to FIG. 4, an aluminum support plate 52 extends along the panel's upper longitudinal side member 34, within the interior volume of the panel, from the panel's back side edge 34 toward, but stopping short of, its front side edge 34. Plate 52 provides support for a sliding track for subsequent attachment to permit installation of an overhead or garage type rear door that will be disposed within the trailer interior and attached to the panel through the inner facer. An aluminum top rail portion 54 is disposed at the top of the panel and attaches to aluminum facer 32.

Also attached to some of the ribs 44 intermittently along the panel's longitudinal length are a plurality of PVC plastic foam dams 55. In this instance, a foam dam 55 is attached to every third support rib 44. As can be seen in FIG. 3, the base of each foam dam has a cut out for each block 48 and 52 in its path and slightly overlaps an end of a block 46. As can be seen in FIG. 5, foam dams 54 all slope toward the same one of the panel's two vertical edges 34 or side members.

As can be seen in FIGS. 3 and 5, a series of holes 56 is drilled through bottom rail 38 and the longitudinal side member 34 behind it communicating with respective inner volume segments 58 defined between adjacent foam dams 55 or between a foam dam 55 and an opposing vertical side member 34. When the polymer inner facer is applied to the panel shell's open major side, such that the laminate polymer facer abuts the tops of blocks 46, 48, and 50, the inner facer also abuts the distal edges of foam dams 55, even with their slope or bend.

A combination of (possibly double sided) foam tape 36 and adhesive initially holds the inner facer and outer facer onto the side members, thereby holding the panel shell together. Clamps placed along the bottom edge of the now-assembled panel shell are attached to carrying lines of a bridge crane disposed along the ceiling of a manufacturing facility. The bridge crane pulls the panel upward so that it is suspended vertically, upside down, with bottom rail 38 oriented upward. The crane conveys the suspended panel shell to a press, such as an A-frame or book-type press 24 in FIG. 2, and disposes the assembled shell between the press platens. The press closes, as described above, and an operator injects foam agent into the respective volume sections 58 sequentially as described above. The first section 58 to be injected with foam is indicated at 58A in FIG. 3, followed sequentially by 58B, 58C, and 58D. As each volume segment fills with foam, the foam pushes a sloped or bent foam dam 55 toward the still-unfoamed adjacent section 58. This further pushes or forces the foam dam against the inner polymer liner facer, strengthening the seal between the panel and the dam. Blocks 48 and 50 laterally support the dam, preventing the dam from pushing over center, further toward the adjacent open volume section, and thereby comprising the foam seal between adjacent sections. The foam dam is unnecessary at the lower end of the panel, due to the presence of blocks 46, but it should be understood that where no blocks 46 are used, the foam dams, if employed, would extend to the panel bottom.

Accordingly, foam dams 55 and blocks 46 seal adjacent volume segments 58 from each other, so that foam expanding in one segment or cavity 58 doesn't leak into an adjacent segment in which foam has not yet expanded. If a foam dam does not properly seal between adjacent volume segments, or if any other leaks occur therebetween, expanding foam in the segment in which foam is rising can leak or inject under substantial pressure (above atmospheric pressure) into the adjacent volume segment, in which the foam has not yet risen. The leaked foam, being injected into the adjacent volume segment under higher than atmospheric pressure and without spatial restriction, tends to have irregular, elongated cell structures, and is partially stripped of contained cell gases, resulting in excessive density. The resulting leaked foam has correspondingly poor thermal characteristics. When foam in the volume segment into which foam from the adjacent segment has leaked then rises up and around the leaked foam to fill the volume space, and the leaked foam forms a sub-volume of poor thermal performance within the volume segment. To prevent such leaks, therefore, foam dams must be carefully installed, and the dams and other partition materials between volume segments must be carefully constructed and arranged.

SUMMARY OF THE INVENTION

The accompanying drawings, which are incorporated in and constitute a part of this specification, illustrate one or more embodiments of the present invention.

In one embodiment of a method of making a at least partially foam-filled sandwich panel enclosing an amount of foam, a panel shell is provided having a first generally planar facer, a second generally planar facer generally parallel to and spaced apart from the first facer, and at least one side member extending between the first facer and the second facer so that the first facer, the second facer, and the at least one side member enclose a volume. At least one of a portion of at least one of the first facer and the second facer, and the at least one side member, is moved away from the volume, thereby defining an opening between the volume and an area exterior to the panel shell. Where the portion is moved, it is moved with respect to a respective remainder of the at least one of the first facer and the second facer. A moveable dispenser is provided proximate the opening and is moved across at least a portion of the opening while the dispenser dispenses an amount of a foam agent into the volume through the opening that is sufficient to generate the entire amount of foam. After the dispenser dispenses the sufficient amount, the at least one of the portion and the at least one side member is moved to a position in communication with at least one other of the first of facer, the second facer, and the at least one side member to thereby close the opening and enclose the volume.

An embodiment of a method of making a sandwich panel enclosing an amount of foam includes providing a panel shell having a first generally planar facer, a second generally planar facer generally parallel to and spaced apart from the first facer, and at least one side member extending between the first facer and the second facer so that the first facer, the second facer, and the at least one side member enclose a volume. The panel shell forms a generally rectangular prism. A panel may be taller at one end than the other, and thus have wedge yet is still considered a generally rectangular prism shaped panel; similarly, opposing facers of a wedged panel are considered to be generally parallel to each other herein. The panel shell is inserted between opposing platens of a press, so that the first facer abuts a first platen and the second facer abuts a second platen. The press comprises a third platen that is pivotable with respect to the first platen. A portion of the first facer is secured to the third platen. The third platen is pivoted with respect to the first platen, thereby moving the portion of the first facer to a first position away from a portion of the at least one side member and defining an opening between the volume and an area exterior to the panel shell. The opening has a first end and a second end opposite the first end. A moveable foam dispenser is provided proximate the opening and is moved between the first end and the second end. The foam dispenser dispenses an amount of a foam agent into the volume through the opening that is sufficient to generate the entire amount of the foam. After the sufficient amount has been dispensed by the foam dispenser, the portion of the first facer is moved to a second position in communication with the at least one side member to thereby close the opening and enclose the volume.

An embodiment of a press for making a sandwich panel enclosing an amount of foam has a first platen having a generally planar engagement surface, a second platen having a generally planar engagement surface, a third platen having a generally planar engagement surface, a control system, and a frame upon which the first platen, the second platen, and the third platen are disposed. The first platen engagement surface opposes the second platen engagement surface. At least one of the first platen and the second platen is moveable with respect to the other of the first platen and the second platen on the frame in response to the control system. The third platen is moveable with respect to the first platen and the second platen in response to the control system. A foam agent dispensing head is in communication with a foam source. The foam agent dispensing head is moveable on the frame over a range of motion in response to the control system. The dispensing head is positioned on the frame so that, upon positioning of the first platen and the second platen so that the first platen engagement surface oppose and are parallel to each other and define a volume therebetween, and movement of the third platen away from the volume, the foam agent dispensing head is in dispensing communication with the volume.

In a still further embodiment, a press for making a sandwich panel enclosing an amount of foam has a control system and a panel shell with a first generally planar facer, a second generally planar facer parallel to and spaced apart from the first facer, and at least one side member extending between the first facer and the second facer so that the first facer, the second facer, and the at least one side member enclose a volume. A first platen has a generally planar engagement surface in engagement with the first facer. A second platen has a generally planar engagement surface in engagement with the second facer. A third platen has a generally planar engagement surface in engagement with at least one of a portion of at least one of the first facer and the second facer, and the at least one side member. The first platen, the second platen, and the third platen are disposed on a frame. The first platen engagement surface opposes the second platen engagement surface. At least one of the first platen and the second platen is moveable with respect to the other of the first platen and the second platen on the frame in response to the control system. The third platen is secured to the at least one of the portion and the at least one side member and is moveable with respect to the first platen and the second platen in response to the control system. A foam agent dispensing head is in communication with an insulating foam source and is moveable on the frame over a range of motion in response to the position control system. The dispensing head is positioned on the frame so that, upon movement of the third platen with respect to the first platen and the second platen, so that the third platen moves the at least one of the portion and the at least one side member away from the volume to thereby define and opening between the volume and an area exterior to the panel shell, the foam agent dispensing head is in dispensing communication with the volume via the opening.

A further embodiment of a method of making a sandwich structure enclosing an amount of a core material generated by an expanded agent material includes providing a shell comprising a first facer, a second facer spaced apart from the first facer, and at least one side member extending between the first facer and the second facer about a circumferential periphery of the panel shell so that the first facer, the second facer, and the at least one side member enclose a volume. An opening is provided in at least one of the first facer, the second facer, and the at least one side member, or between the at least one side member and at least one of the first facer and the second facer, at or generally parallel to a seam between the at least one side member and one of the first facer and the second facer and extending a distance of at least about 2% of the entire length of the circumferential periphery. A moveable dispenser is provided proximate the opening, and the dispenser is moved across at least a portion of the opening, while the dispenser dispenses an amount of the agent material into the volume through the opening that is sufficient to generate the entire amount of core material.

In a further embodiment of a method of making a sandwich structure enclosing an amount of a core material generated by an expanded agent material, a shell is provided that encloses a volume. A press has a plurality of platens and has a frame and a control system. A dispenser is moveable on the frame responsively to the control system at a predetermined speed and is operable to dispense an amount of the agent material at a predetermined rate. The shell is disposed within the press so that platens secure the shell in a position. An opening is provided in the shell sufficient so that a pour of the agent material into the volume through the opening at the predetermined rate and across the distance at the predetermined speed deposits an amount of agent material into the volume that is sufficient to generate the entire amount of core material. The dispenser is moved proximate the opening and across at least a portion of the distance while dispensing the amount of foam agent into the volume through the opening.

In an embodiment of making a sandwich panel enclosing an amount of foam according to an embodiment of the present invention, a panel shell is provided that comprises a first generally planar facer, a second generally planar facer spaced apart from the first facer, and at least one side member extending between the first facer and the second facer about a circumferential periphery of the panel shell so that the first facer, the second facer, and the at least one side member enclose a volume. A press is provided having opposing platens and having a frame and a control system. A dispenser is moveable on the frame responsively to the control system at a predetermined speed and is operable to dispense an amount of foam agent at a predetermined rate. The panel shell is disposed within the press so that the platens secure the panel shell in a position. An opening is provided in at least one of the first facer, the second facer, and the at least one side member, or between the at least one side member and at least one of the first facer and the second facer, at or generally parallel to a seam between the at least one side member and one of the first facer and the second facer extending a distance sufficient so that a pour of the foam agent into the volume through the opening at the predetermined rate and across the distance at the predetermined speed deposits an amount of foam agent into the volume that is sufficient to generate the entire amount of foam. The dispenser is moved proximate the opening and across at least a portion of the distance while dispensing the amount of foam agent into the volume through the opening.

In a still further embodiment, a method of making a sandwich structure enclosing an amount of a core material generated by an expanded agent material includes providing a shell that encloses a volume. A press has a plurality of platens and has a frame and a control system. A dispenser is moveable on the frame responsively to the control system at a predetermined speed and is operable to dispense an amount of the agent material at a predetermined rate. The shell is disposed within the press so that the platens secure the shell in a position and so that one of the platens secures a surface of the shell. One of the platens is moved so that the one of the platens moves at the surface away from a remaining surface of the platen shell, thereby defining an opening in the shell between the volume and an area exterior to the shell. The dispenser is moved across at least a portion of the opening while dispensing agent material into the volume through the opening.

BRIEF DESCRIPTION OF THE DRAWINGS

Aspects of the invention can be better understood with reference to the following drawings. The components in the drawings are not necessarily to scale. An enabling disclosure of the present invention, including the best mode thereof, is set forth in the specification, which makes reference to the appended drawings, in which:

FIG. 10D is a perspective view of a press according to an embodiment of the present invention;

Figure 1:
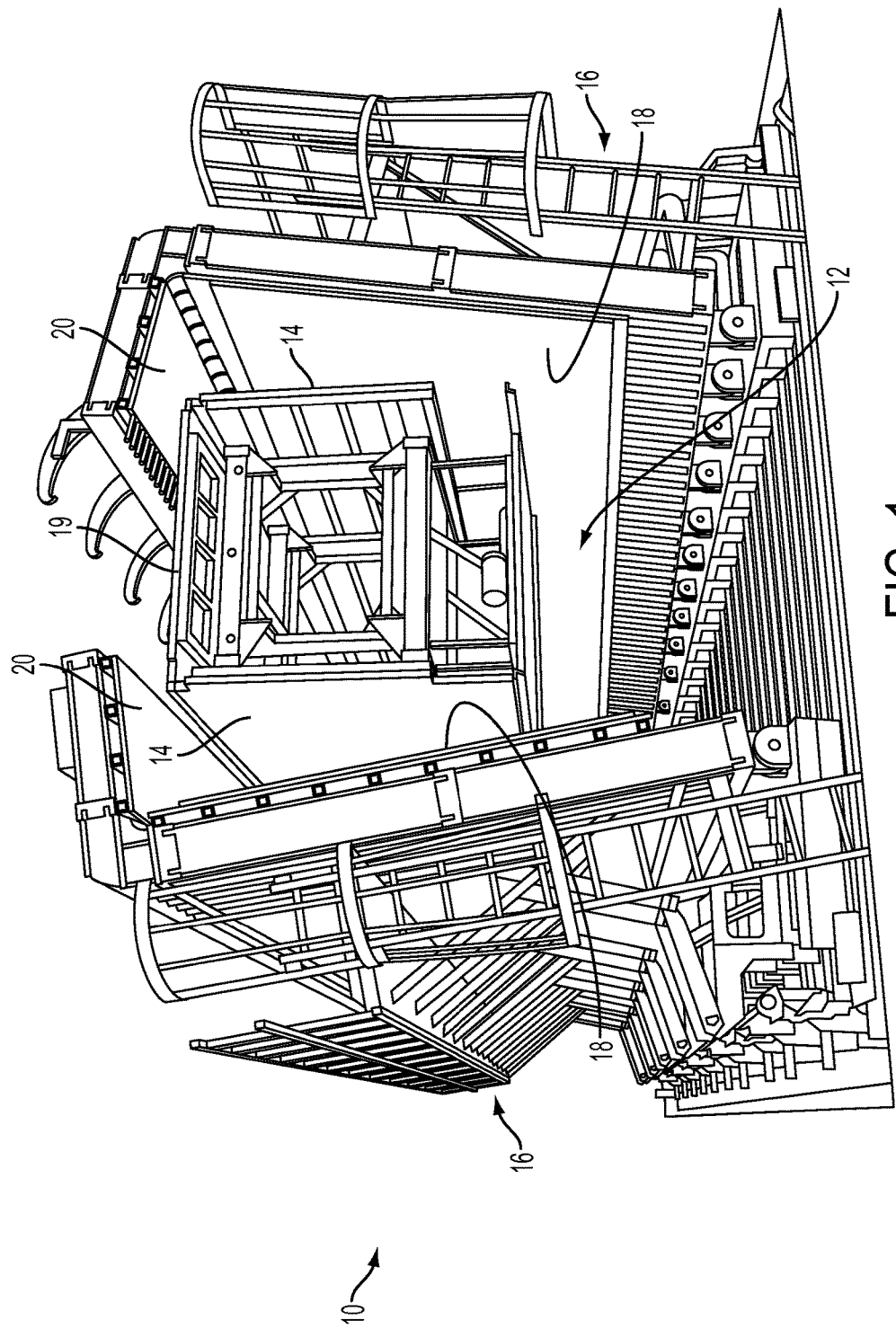
FIG. 1 is a schematic view of an insulated foam press as in the prior art.
Figure 2:
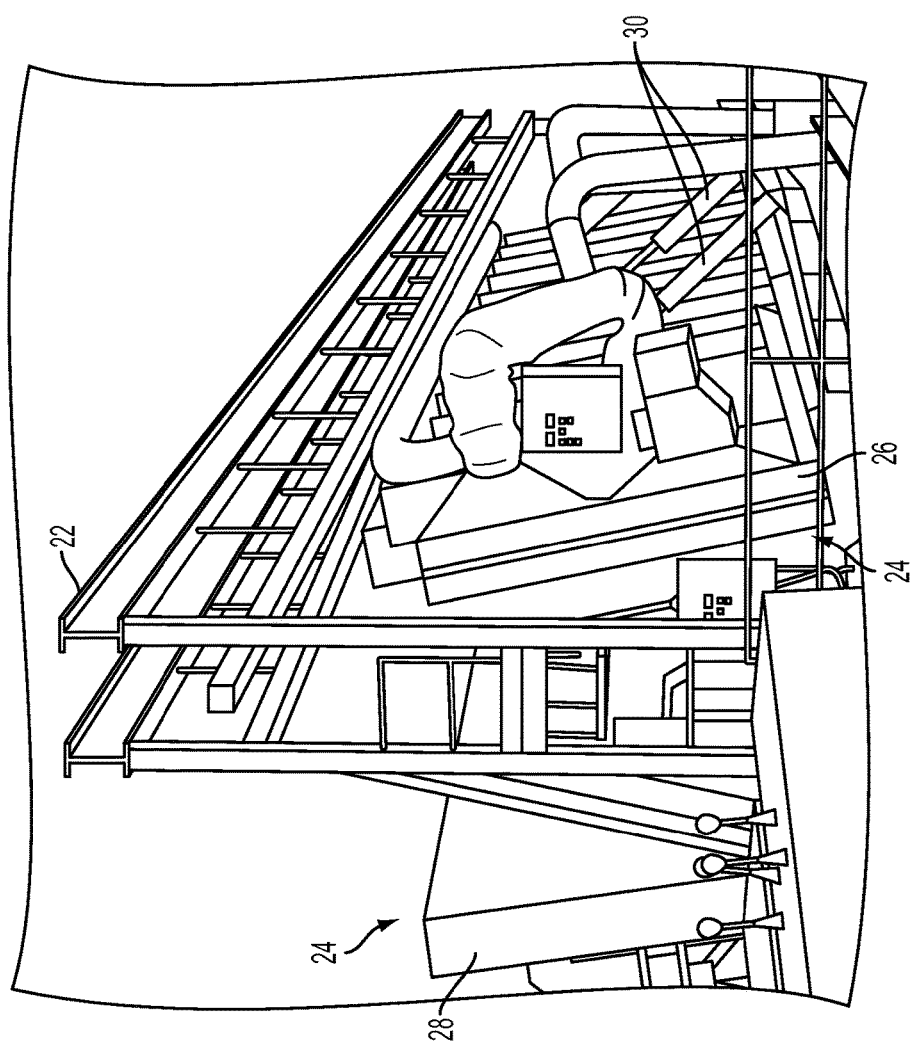
FIG. 2 is a schematic view of an insulated foam press as in the prior art.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawing. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
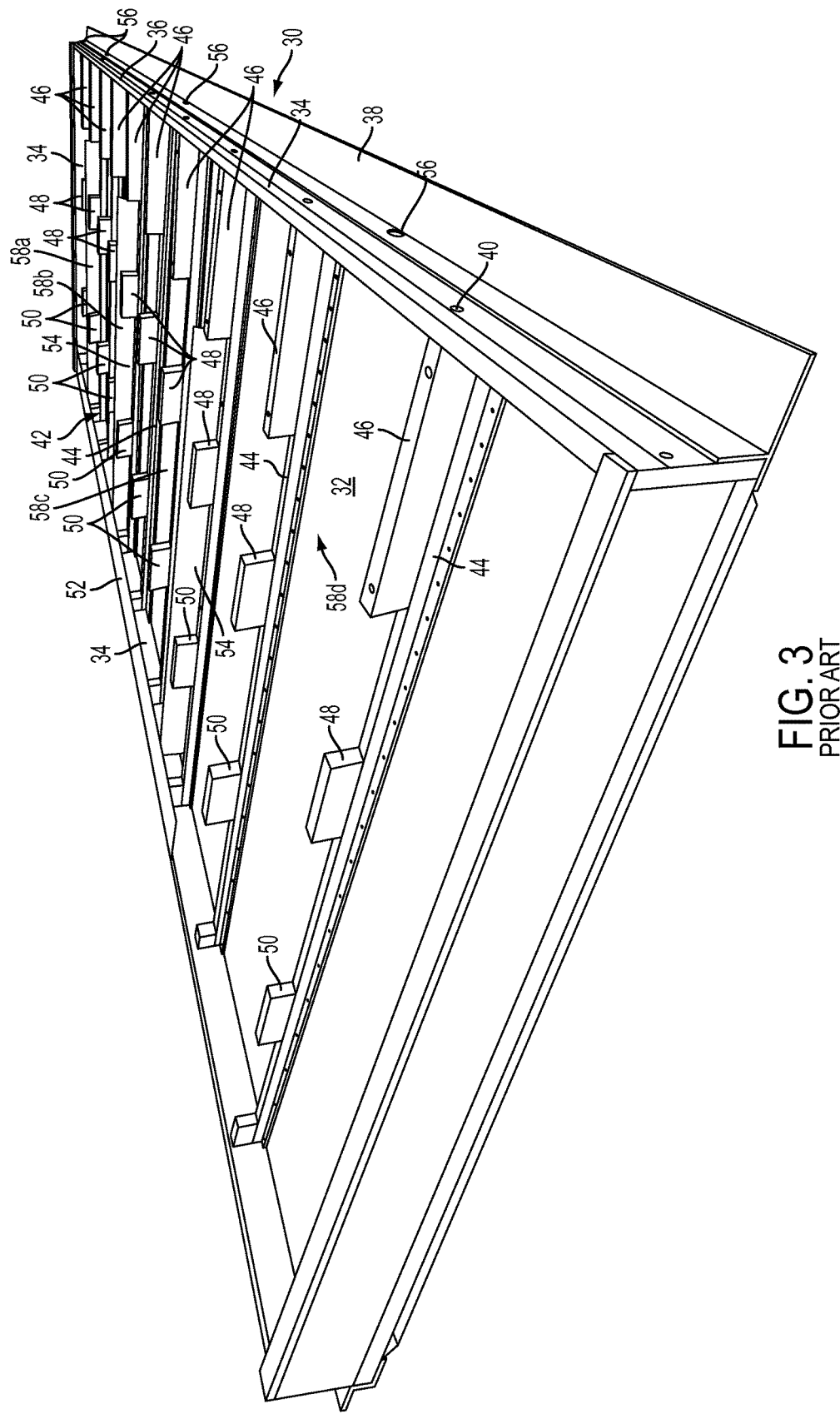
FIG. 3 is a partial perspective view of a panel shell for use in a prior art method of insulating sandwich panels.
Figure 4:
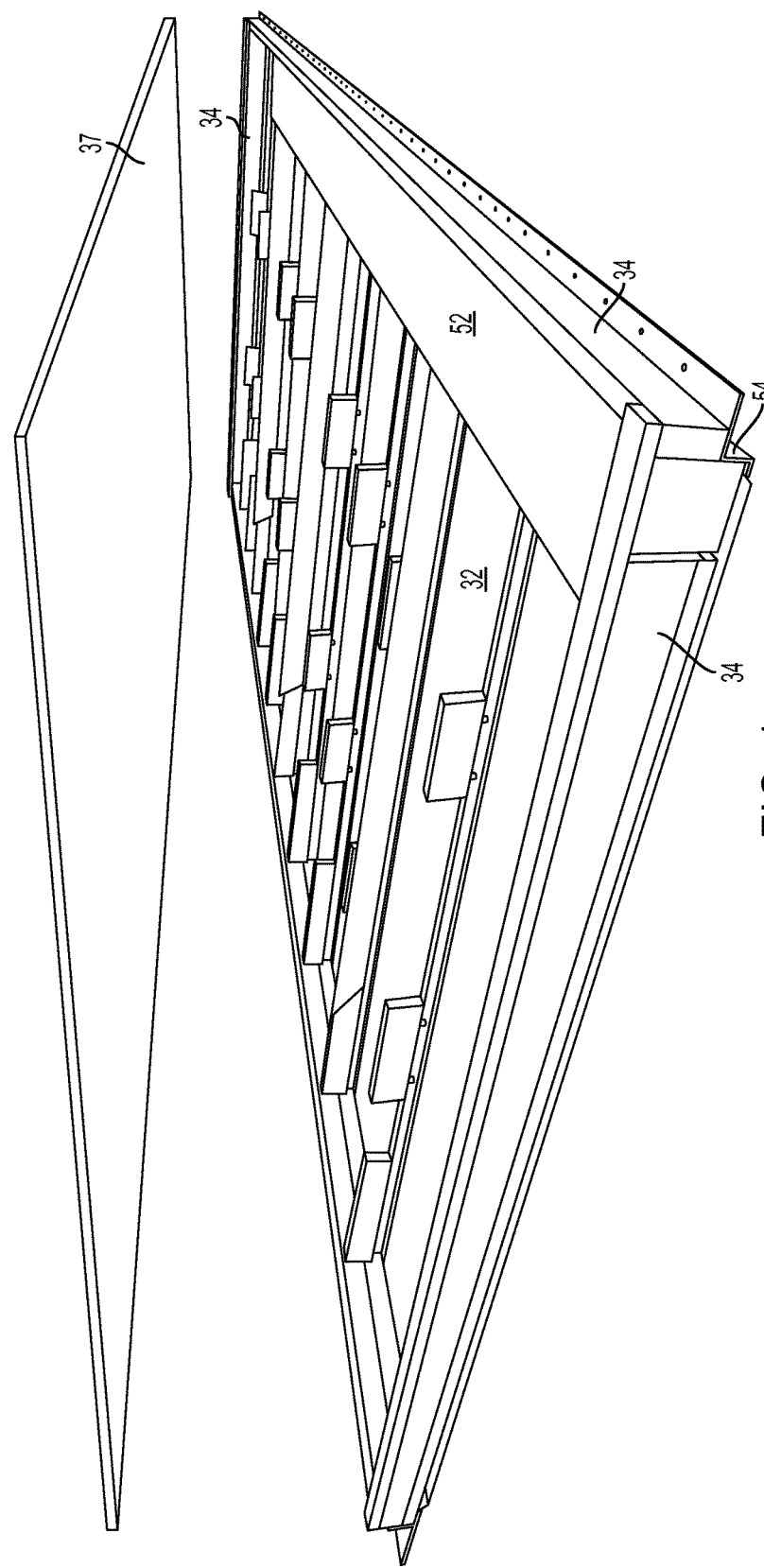
FIG. 4 is a partial perspective view of a panel shell for use in a prior art method of insulating sandwich panels.
Figure 5:
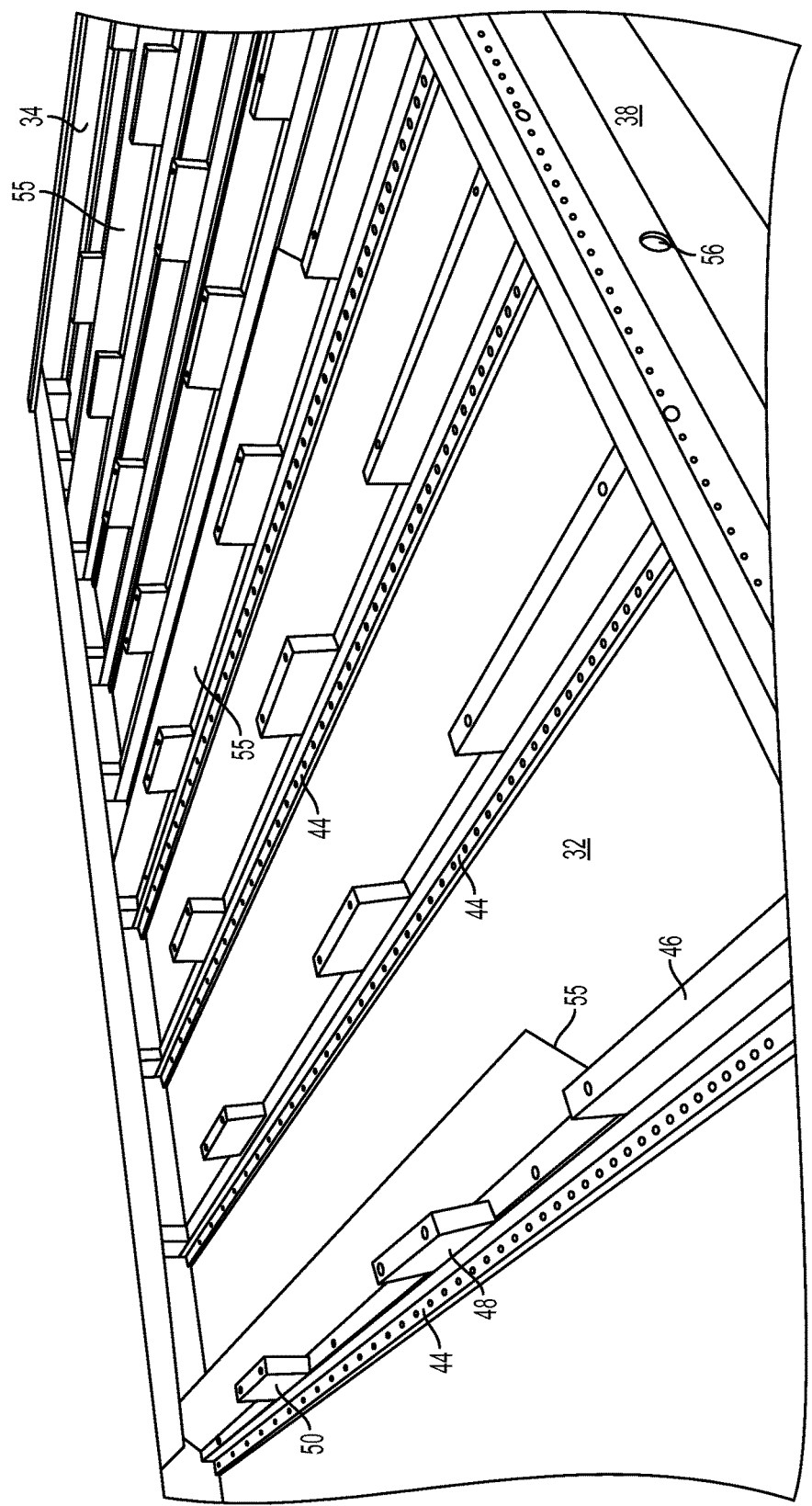
FIG. 5 is a partial perspective view of a panel shell for use in a prior art method of insulating sandwich panels.
Figure 6:
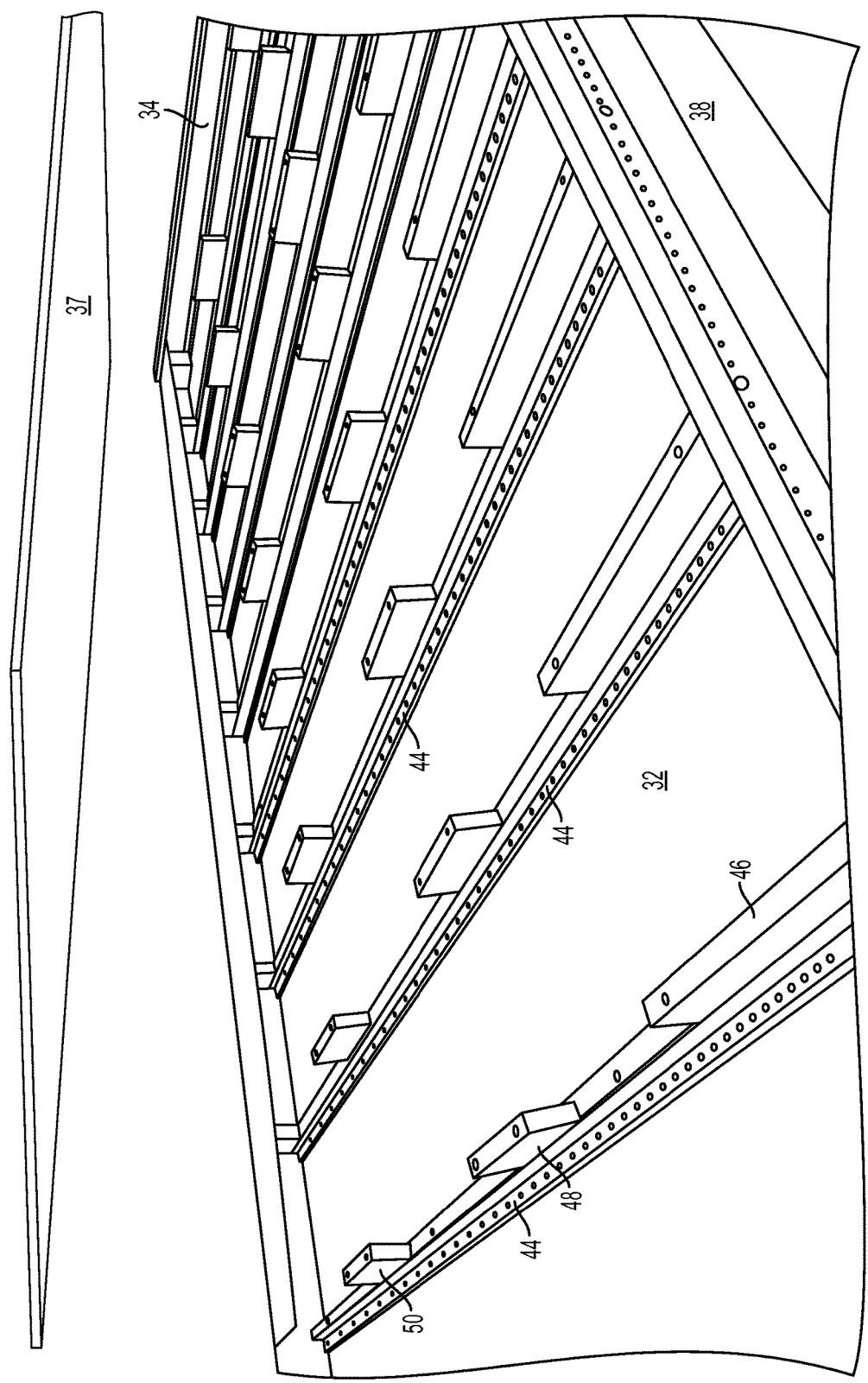
FIG. 6 is a partial perspective view of a panel shell for use in a method of constructing an insulated sandwich panel according to an embodiment of the present invention.

As described in more detail below, the systems and methods of the embodiments described below allow the pouring, for instance by a single continuous pour or a sequence of discrete continuous pours, of liquid or partially foamed or froth foam agent to the interior volume of a panel shell without requiring the sequential injection of foam agent into individual interior volume segments or otherwise into a panel interior having a complex spatial arrangement, even when the panel includes interior structures that interact with the facers. In the embodiments discussed herein, the continuous pours are made from a dispensing device that moves (continuously or intermittently) along a path that maintains a substantially constant offset from the panel shell's periphery, without the need to diverge from that path to engage injection access holes. Accordingly, the apparatus and methods of these examples allow the deposit of all the foam agent needed for a given panel in one movement of a dispensing head over the panel shell, rather than requiring discrete insertions of a dispensing head into one or more injection access holes. An example of such a panel shell is the rectangular prism-shaped panel shell 60 shown in FIG. 6, which may be used to form the sides of a trailer, for example an insulated, refrigerated trailer. A generally rectangular polymer facer forms the panel's inner surface when the panel is assembled as part of the trailer, whereas a rectangular aluminum facer forms the panel's outer surface. The facers are spaced apart from each other by the side members and are generally parallel to each other, which should be understood to accommodate slight angles between the two facers (for example up to about 2°, and in one preferred embodiment up to about 0.5°, and in a further embodiment between about 0.09° and about 0.2°), also referred to as wedge, or stepping of one or both facers, as should be understood. The shell is constructed in the same manner as the shell of FIGS. 3-5, except that foam dams 54 (FIG. 5) and injection access holes 56 (FIG. 5) are omitted. In another embodiment, the foam dams remain as shown in FIGS. 3-5 in order to define discrete compartments or volumes distinct from each other with respect to the formation of foam, but the access holes remain omitted. Foam tape 36 (and/or adhesive or mechanical fasteners) again lines side members 34 and in part secures the polymer inner facer (not shown) and outer facer about the shell's perimeter to thereby fully enclose the interior volume. Seams are thus defined at the meeting between the side members and the inner facer and between the side members and the outer facer. The inner polymer facer may be constructed as a laminate as described in U.S. Pat. No. 7,025,408 or 7,901,537, or United States Published Application 2013/0207413, the disclosures of which are incorporated herein by reference for all purposes. As discussed in those references, mechanical structures such as scrim may be provided on the side of the inner facer facing the panel interior volume to strengthen the panel and/or to facilitate the foam's adherence. Coatings, such as epoxy or polyester coatings, may also be used to facilitate adherence between the inner liner and the foam and also between the inner side of the aluminum facer and the foam. And as noted below, the foam can adhere to the side members when the side members are retained in the panel. Thus, the foam generally holds the panel surfaces together in the finished panel. In this embodiment, there are four discrete side members, one for each linear side of the rectangular prism.

Figure 7:
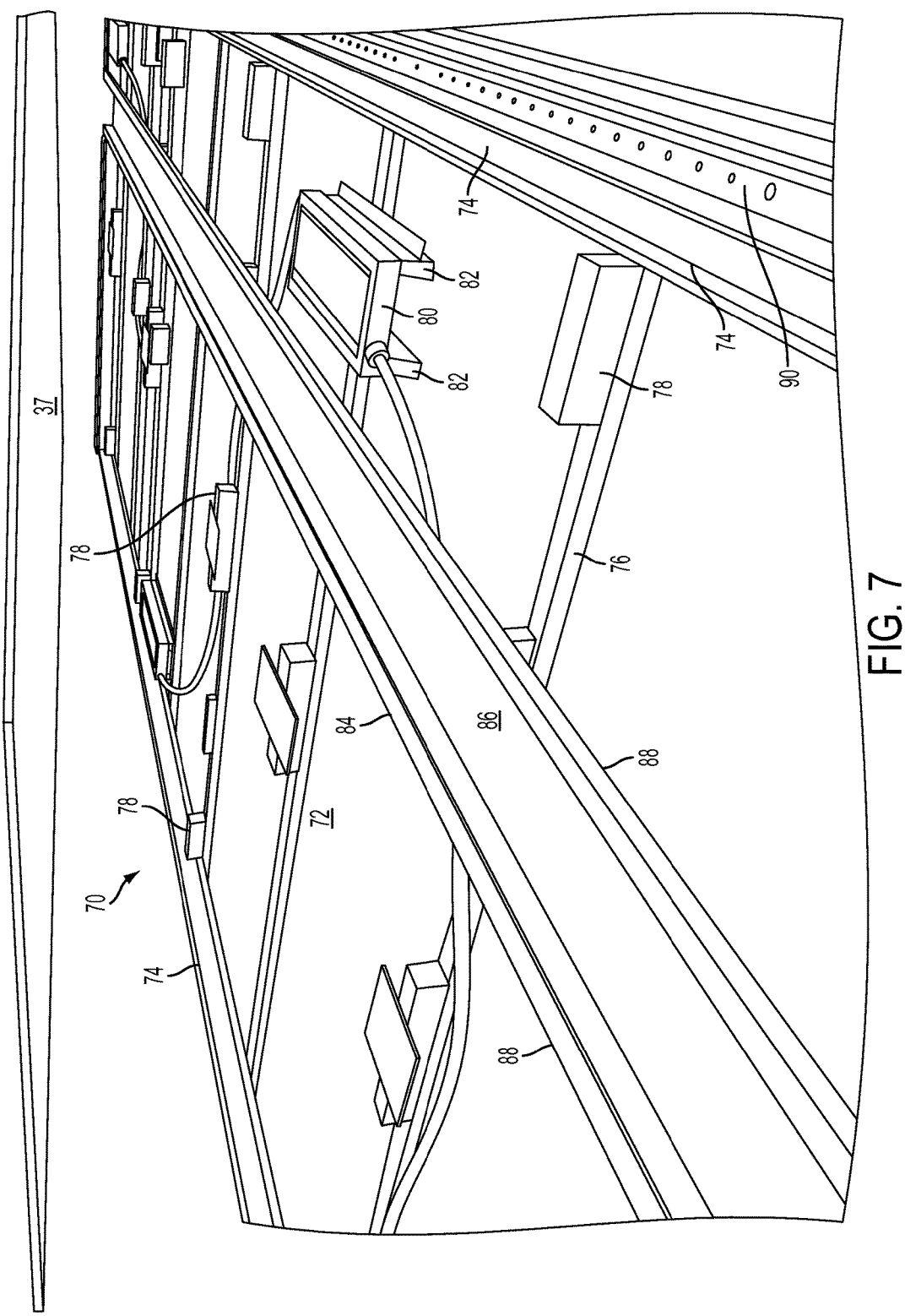
FIG. 7 is a partial perspective view of a panel shell for use in a method of constructing an insulated sandwich panel according to an embodiment of the present invention.

Referring also to FIG. 7, a sandwich panel shell 70 for use as a roof panel includes a generally planer aluminum sheet facer 72, an opposing polymer inner facer 73, and perpendicularly-oriented wood or polymer side members 74 extending between the inner and outer facers around the periphery of the panel shell defined by the facer edges. As described above, the inner and outer facers can be held to the side members in the assembled shell by foam tape, other adhesives, or other mechanisms. Support ribs 76 extend between the longitudinal side members 74 parallel to each other and provide support to outer facer 72, similarly to the side panels' ribs 44. In this example, there are no logistics tracks or scuff band to be attached to the roof panel, and the sandwich panel therefore has no rows of corresponding support blocks as are present in the side panels. The roof panel does, however, have intermittently spaced support blocks disposed on ribs 76 throughout the volume, at a height just below the height of polystyrene members 74. When the polymer inner liner facer is applied to the open shell as shown in FIG. 7, and the panel is inserted into the press, the polystyrene side members compress to some degree, to the depth of blocks 78. Auxiliary blocks are disposed between the platens, outside the panel, to provide a final stop depth and present crushing of the panel. One or more light fixture enclosures 80 are secured to facer 72 by support blocks 82 attached to the underlying rib 76. A hole is cut in the inner polymer facer (not shown) so that the front face of light enclosure 80 extends into the facer hole so that activation of the subsequently installed light can illuminate a trailer interior.

A conduit tray or trough (raceway) 84 runs the length of panel shell 70, parallel to longitudinal side members 74. A center trough depression 86 extends inward from side rails 88 so that the trough extends into the panel shell interior volume, resting on support blocks that are, in turn, secured to respective ribs 76. The polymer inner facer is formed into sections in order to accommodate conduit track 84. A first section extends from one of the side rails 88, away from center trough 86, to attach to one of the rails adjacent side member 74. A second, shorter, section of the polymer inner facer extends from the opposite rail 88 to the other longitudinal side rail below side number 74. The polymer facer attaches to the rails by foam tape or other suitable means. As noted, the short facer section includes a hole to accommodate light 80. Trough 86 can be used to accommodate electrical and hydraulic conduits running the trailer's length, as well as refrigerant lines used in the operation of one or more refrigeration devices eventually mounted to various points in the trailer and supported by the trailer roof. As the trough 86 opens downward, into the trailer interior, it may be covered with a still shorter section of the polymer inner facer, extending over trough 86 between the opposing rails 88. When the three polymer facer sections are assembled onto panel shell 70 (although in multiple pieces, considered herein as the roof panel facer), the outer and inner facers, along side members 74, completely enclose the sandwich's interior volume. As with the side panel described with regard to FIG. 6, the roof panel has no foam dams nor access holes, although it should be understood that the roof panel, like the side panel, may be formed with discrete volume segments within its interior volume, separated by foam dams. As noted above, aluminum top rail portions 90 are disposed on either longitudinal side of the roof sandwich panel.

Both the side and roof panel shells include vents, which in certain embodiments are made at multiple points around the panel's perimeter in the side members. The vents allow air or other gases to exit the panel interior as the foaming agent exotherms and foam expands in the interior volume. Strategic placement of the vent openings allows the expansion of the foam agent to completely fill the volume, reducing the likelihood of entrapped gas volumes or voids in the insulated panel core. As discussed above, filter material is placed the vents, on the interior side, to allow the exit of air or other gases but block passage of foam from the interior.

While the presently described embodiments include, form, or are used in the manufacture of panels utilizing foam as the panel core, it should be understood that a core of a panel as described herein can be an expanding material such as foam.

Figure 8:
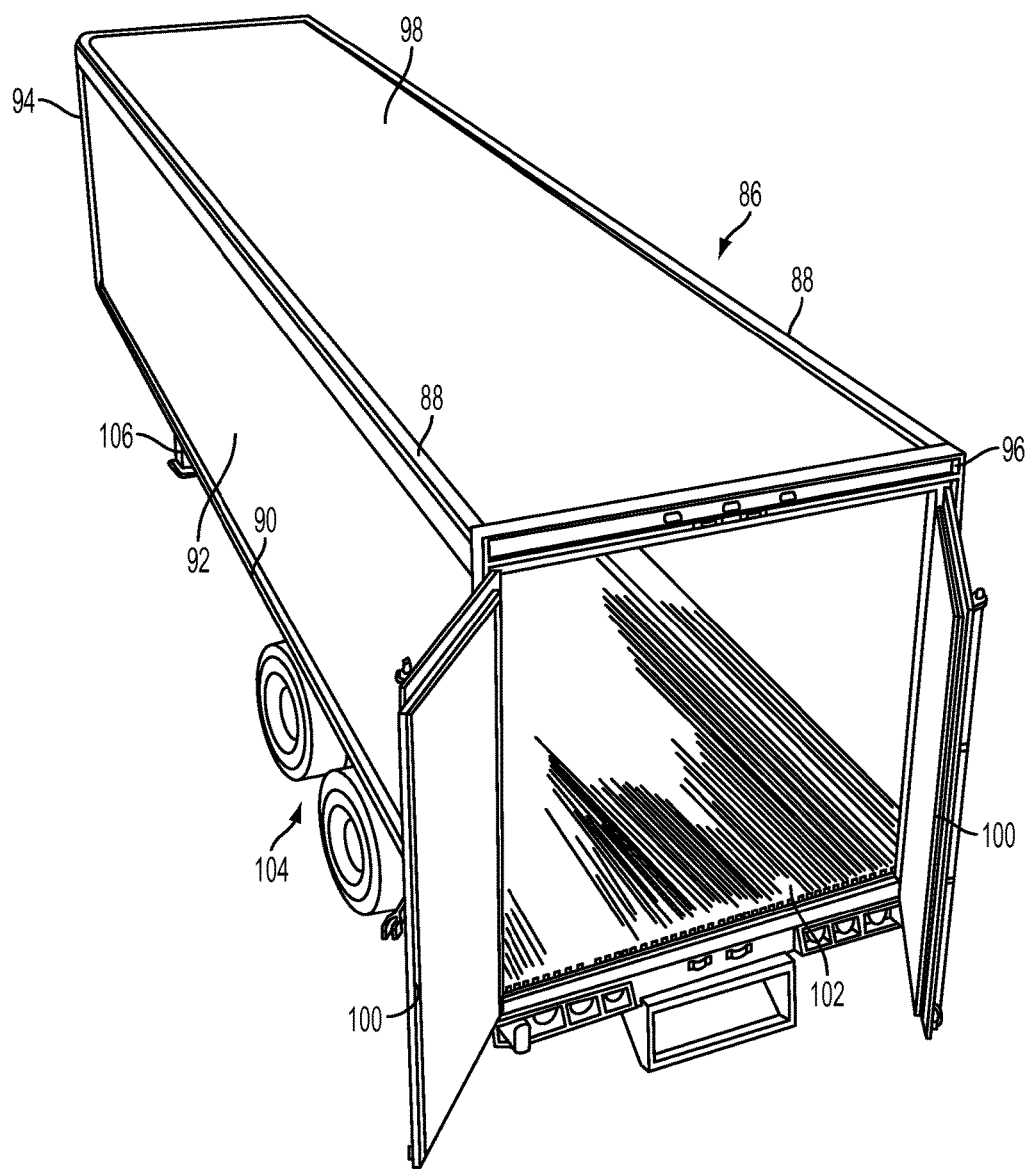
FIG. 8 is a rear perspective view of a van type trailer embodying insulated panels made in accordance with an embodiment of the present invention.

Referring to FIG. 8, an insulated van trailer in accordance with an embodiment of the present invention is illustrated generally at 86. While an insulated van trailer is referred to throughout the present application for convenience, the description of insulated structures herein is intended to encompass both fully insulated and partially insulated refrigerated and non-refrigerated trailers, as well as bimodal type shipping containers or similar insulated boxes or other structures such as railway cars or the like used to carry cargo and constructed in accordance with the principles of the present invention. Moreover, panels constructed as described herein could be used in insulated truck bodies or buildings. Insulated van trailer 86 includes top rails 88 and bottom rails 90 (only one shown). Top rails 88 and bottom rails 90 are connected by a side wall structure 92 comprised of one or more panels as discussed above with regard to FIG. 6. A front wall assembly 94 and rear frame assembly 96 are connected on opposite ends of the top and bottom rails 88 and 90. A front wall (not shown) can also be constructed of an insulated panel as discussed above with regard to FIG. 6. A roof structure 98 and rear doors 100 for permitting entry and exit of cargo cooperate with a floor structure 102 to form a monocoque construction insulated van trailer. Running gear assembly 104 and front support members 106 are also provided as is well known in the art. With the exception of the method of inputting foam into the sandwich panels forming the wall and roof structures, the construction of insulated van trailer 86 is in accordance with known prior art trailer constructions. Although not detailed in the presently described examples, it should also be understood from the present disclosure that the present methods may be used to form foam-enclosing trailer floors and end panels, and a trailer, container, truck body, or other insulated vehicle constructed of side, roof, floor, and/or end panels constructed as discussed herein is expressly part of the present disclosure.

Figure 9:
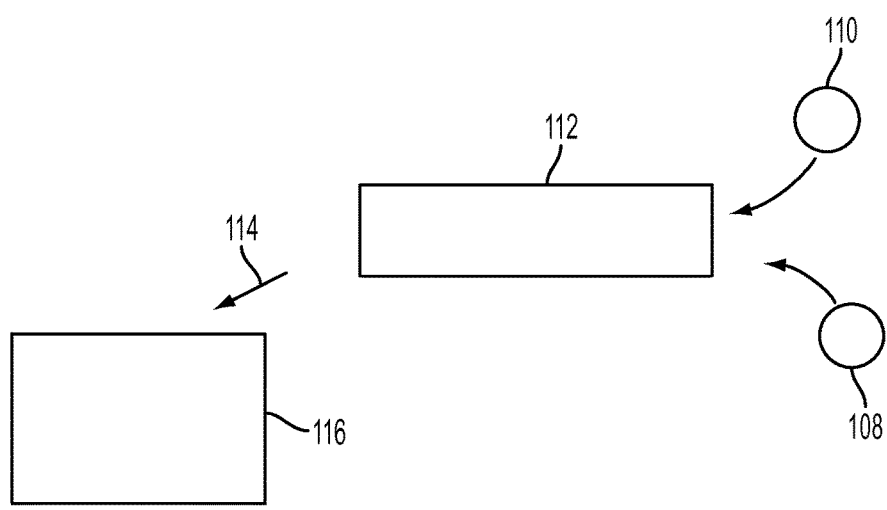
FIG. 9 is a schematic view of equipment for practicing an embodiment of a method according to the present invention.

FIG. 9 provides a schematic representation of various stations utilized in a manufacturing method according to an embodiment of the present invention. Aluminum sheet material used for the outer facer is stored in rolled form at 108 or in individual sheets with pre-riveted ribs. Polymer inner liner material may be stored in rolled or stacked one-piece form at 110. To begin construction of a panel, aluminum sheet facer material is rolled from supply 108 onto a long table 112 and cut to the approximate size of the panel. That is, the facer is a rectangular sheet of dimensions approximating the size of the finished sandwich panel. Once cut to size, wood or polymer side members are secured about the perimeter of the aluminum outer facer by foam tape or other adhesive or connector materials that may generally permit relative movement or slip between either or both of the side members and the facers. Transverse ribs are attached with rivets or adhesives to the inner side of the aluminum facer for support. Support blocks may be added, if the panel is a side or a front panel, to support a scuff band and/or logistics tracks (or other attachment such as lighting or other devices requiring support), as discussed above. If the sandwich panel is to be used in the trailer roof, lighting or other utilities may be secured in the panel volume and/or a conduit trough may be installed. Polymer inner material from source 110 may then be rolled or otherwise placed onto the side members opposite the outer facer, cut to corresponding size, and secured to the side members by foam tape or other suitable adhesive. Again, for the roof sandwich panel, the inner facer may comprise multiple discrete sections to accommodate the conduit trough.

The side members may become part of the panel, or they can be included in the panel shell in the press but later removed from the finished panel after foaming. In the embodiments described herein, the wooden or polymer side members adhere to the foam when the foam expands into the panel volume, thereby holding the side members in place. If it is desired to remove the side members after the panel is removed from the press, however, they may be covered with wax or plastic or crepe sheeting or similar material on the foam side, so that the foam does not attach to the side members and so that they may therefore be pulled away from the panel after foaming Still further, even in panels in which the side members attach to the foam, the side members may be trimmed from the finished panel if desired.

Once the sandwich panel shell is assembled, clamps are placed along one of the two longitudinal edges, and carrying lines of a bridge crane mounted proximate to the ceiling of the manufacturing facility are attached to the clamps. The bridge crane lifts the panel and transports the panel, as indicated at 114, to a press 116, depositing the vertically oriented and slightly tilted panel between the press platens with the clamped longitudinal edge facing upward.

Figure 11:
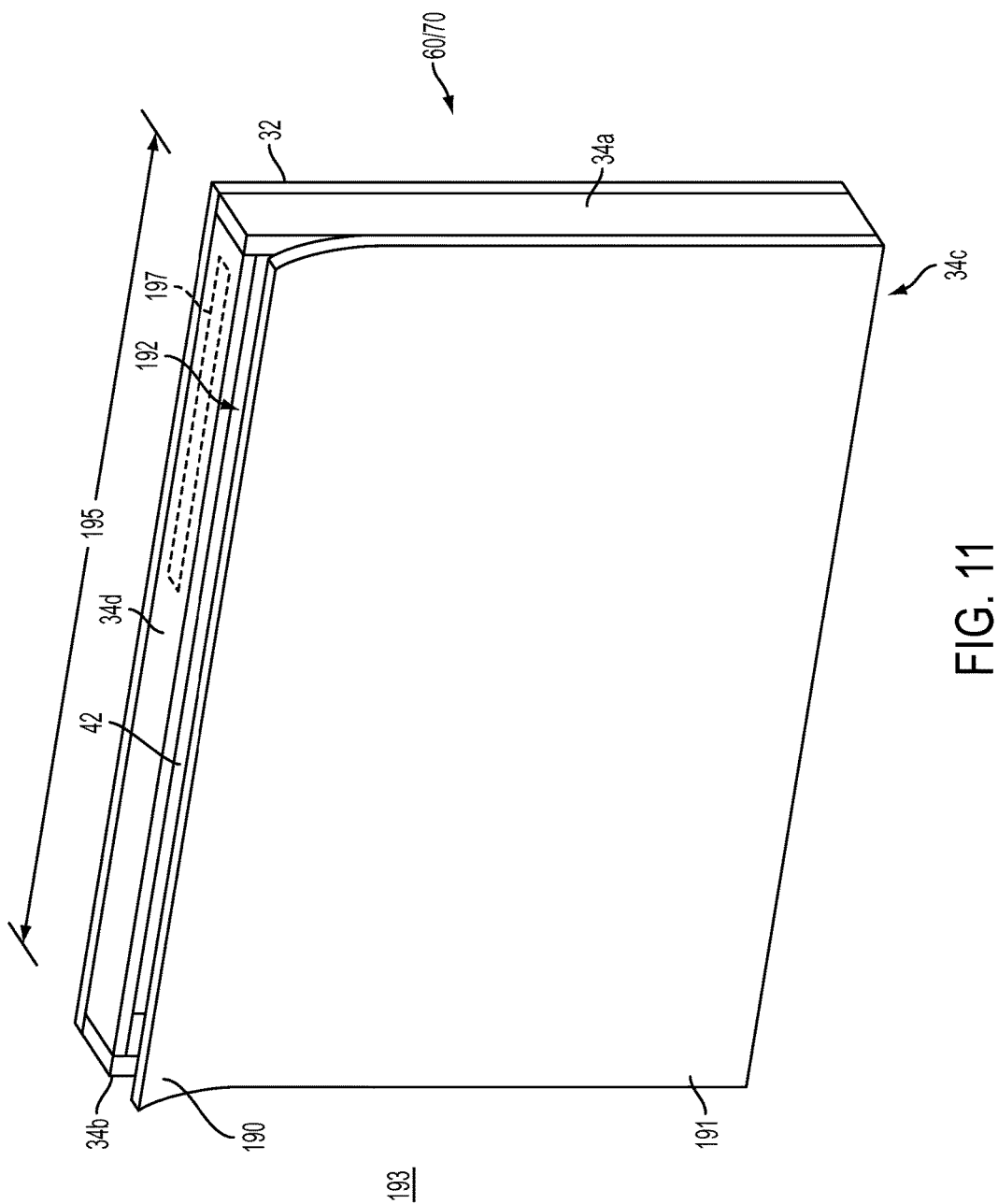
FIG. 11 is a schematic illustration of a panel shell for use with a press and method according to an embodiment of the present invention.

As will be apparent from the discussion below, the clamped longitudinal edge, because it will be the edge of the panel facing upward in the press between the platens, should be one in which at least one of the two facers is attached by the foam tape to the side members but is not otherwise attached to any interior structure within the panel interior volume for a distance from the edge at least equal to the depth of a platen that is moveable with respect to the main press platens (see facer portion 190, as indicated at FIG. 11), as described in more detail below. In the presently-described embodiments, this is a distance of about two to about four feet (of an eighty inch to one hundred inch height facer), but it will be apparent that this distance can vary. In one embodiment, about 40% to about 50% is moved with respect to the main press platen (about 39 inches of an eighty to one hundred inch height facer), and in another embodiment about 30% to about 60%. In the presently-described embodiments, and for example as indicated at 190 in FIG. 11, the polymer inner liner is bent to allow access to the panel interior. It is also possible to bend the aluminum outer facer constructed without supporting ribs, but in these examples this is not preferred, due to the structural ribs attached to the outer facer.

Figure 10A:
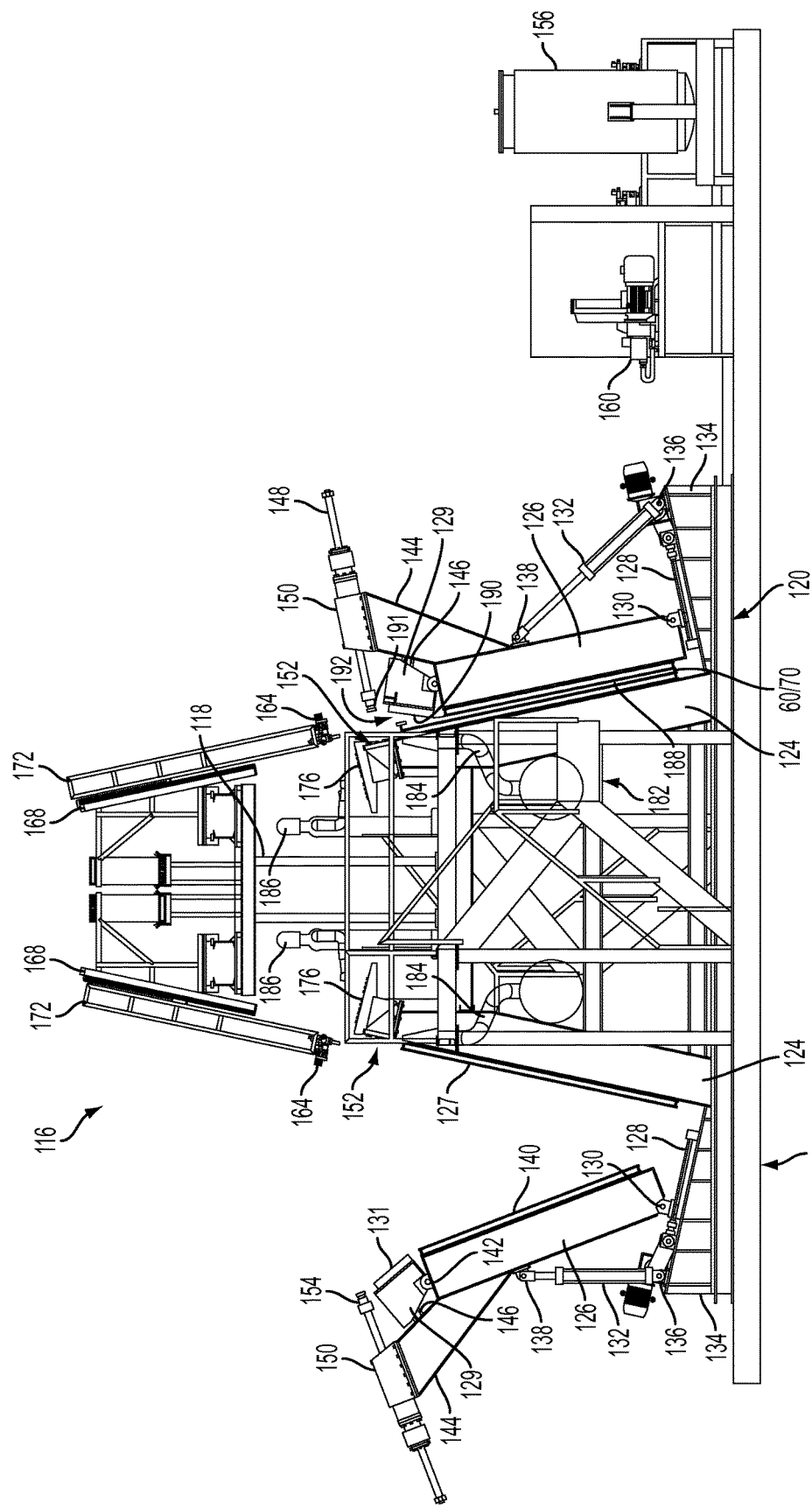
FIG. 10A is a side view of a press according to an embodiment of the present invention.
Figure 10B:
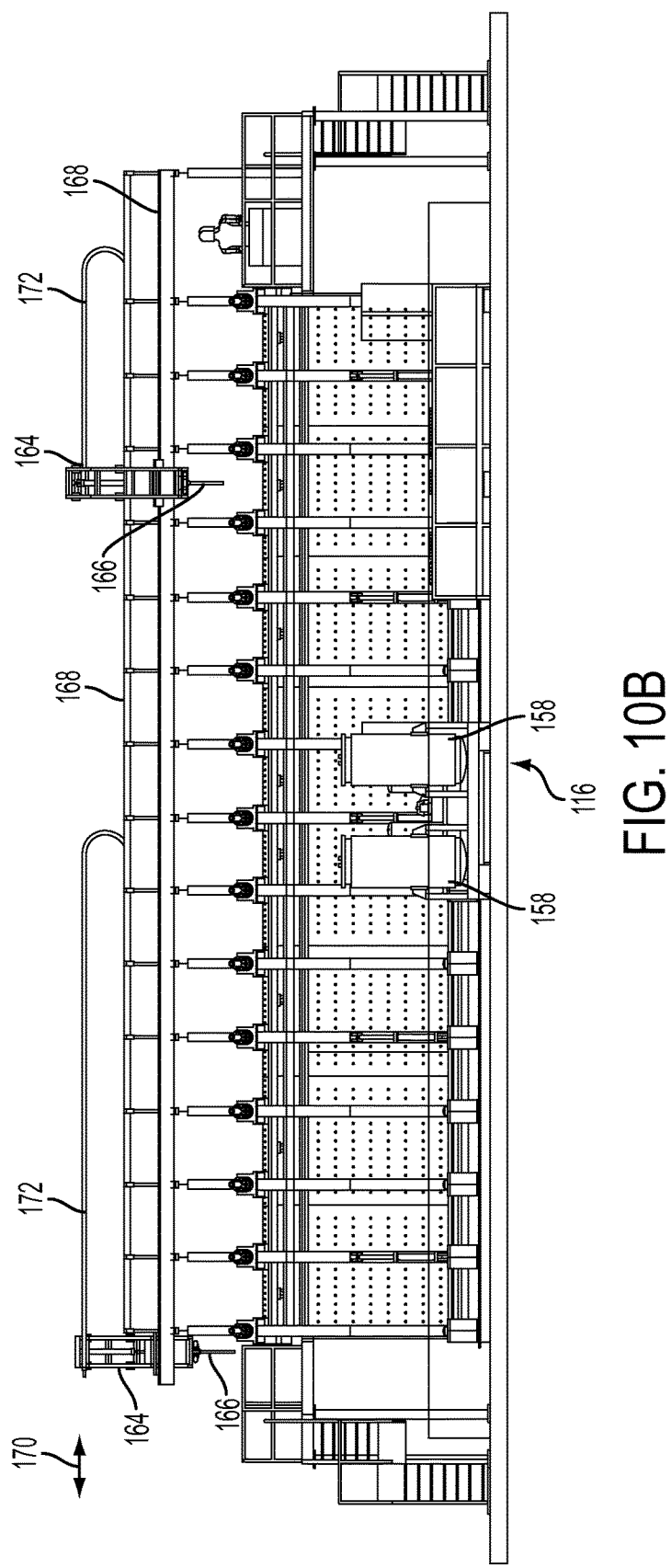
FIG. 10B is a side view of a press according to an embodiment of the present invention.
Figure 10C:
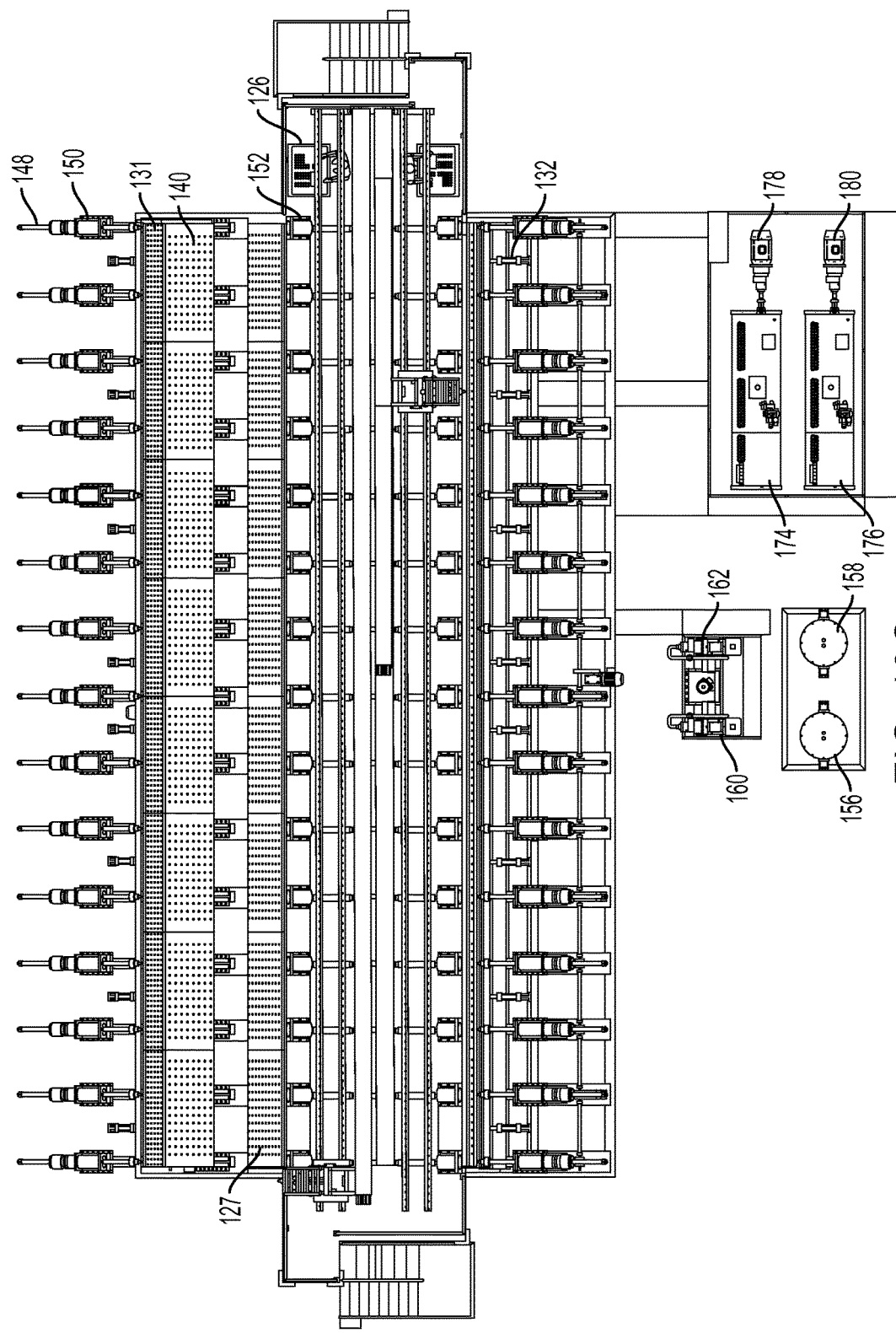
FIG. 10C is a side view of a press according to an embodiment of the present invention.

Referring to FIGS. 10A-10C, press 116 is formed on a frame 118 and supports two identical, mirror image discrete sub-presses 120 and 122, each comprised of a stationary inner platen 124 and a moveable outer platen 126. Each inner platen 124 is disposed at an angle of approximately fifteen degrees with respect to vertical and defines an engagement face 127. Each outer platen 126 is pivotally secured to a track 128 at opposing corner hinges 130 that are reciprocally slidable on track 128. A series of hydraulic cylinders 132 are pivotally secured to a ramped base 134 at pivotal joints 136 and attached to a back surface of platen 126 at pivotal joints 138. Platen 126 defines a generally planer front engagement face 140.

When hydraulic cylinders 132 are in the retracted position, as shown on the left side of FIG. 10A, the cylinders pull platen 126 away from platen 124, causing platen 126 to slide up ramped base 134 on hinges 130 and track 128. This tilts platen 126 away on hinges 130. When hydraulic cylinders 132 expand, this pushes platen 140 down track 128, pivoting the platen so that front face 140 becomes parallel to and opposite front face 127 of platen 124, as shown on the right side of FIG. 10A.

Platen 126 is smaller than platen 124, but attached to the top of platen 126 is a pivotable third platen 129 that defines an engagement surface 131 that, in combination with surface 140, approximately equals the surface area and shape of the opposing engagement surface 127. Third platen 129 is pivotally disposed with respect to platen 126, and moveable with respect to platen 124, about an axis indicated at 142. Support structures 144 extend rearwardly from the back surface of platen 126. A plurality of hydraulic pistons 146 are attached at one end to supports 144 and to the back surface of platen 129 so that contraction of cylinders 146 pivots platen 129 about axis 142 so that planar engagement surface 131 moves away from the plane defined by planar surface 140. Expansion of cylinders 146 pivots platen 129 back to a second position in which surfaces 131 and 140 are co-planar.

At the top of supports 144 are a plurality of retractable lock arms 148. Arms 148 are reciprocal within a powered sleeve 150 to engage and disengage receiving locks 152 at locking heads 154. Lock arms 148 assist the press hydraulics in resisting opposing force generated by the expanding foam.

Tanks 156 and 158 respectively store the polyol and isocyanate components for the dispensing head's polyurethane liquid or partially foamed foam agent. Respective pumps 160 and 162 pump both components through liquid conveying conduit hoses to each of two foam mixing and depositing heads 164, one for each of the sub-presses. Each mixing head 164 has a mixing manifold or chamber in which the polyol and isocyanate mix and from which the resulting liquid or partially foamed foam agent is deposited out of a pouring tip or nozzle 166. In the presently described embodiments, a high pressure impingement mixing-type (HPIM) dispenser is used, but it should be understood that other types of dispensing could be used. Further, while it should be understood that an insulating foam agent (i.e. a foam agent that generates an insulating foam) is described herein, the present system and method may be used to manufacture panels that enclose foams utilized solely for structural support.

Each mixing head 164 includes a set of powered wheels or gears driven by an electric or hydraulic motor located on the head and secured on a rail system 168 so that automated operation by computer control may be employed to cause actuation of the motor drives, moving the rollers to thereby move mixing heads 164 back and forth along the length of press 116 on rails 168, as indicated by arrow 170. Each mixing head is attached to a respective cat track 172 that festoons supply hoses from pumps 160 and 162 for the polyol and isocyanate, as well as electrical or hydraulic lines for the electrical or hydraulic motors on the mixing heads, and electrical communication lines between electrically controlled valves and other electrical control components on mixing heads 164 and respective control computers 176. Respective heaters 174 and 176 heat water or other suitable fluid to a desired temperature, for example 110° F., and feed the fluid via pumps 178 and 180 and respective hose lines to platen pairs 124/126 of the respective sub-presses 120 and 122. As described above, the heated fluid circulates through passages in both platens to initially heat the facers of the empty panel shells and then to carry heat from the panel as foam exotherms (i.e. gives off heat) within the panel volume. Computers 176 control the delivery of water to and circulation through the platens by operation of pumps 178 and 180.

With regard to the control system, i.e. computer systems 176 and its associated relays, valves and other associated electrical and mechanical control apparatus in the presently described embodiments, it will be understood from the present disclosure that the functions ascribed to computer systems 176 may be embodied by computer-executable instructions of a program that runs on one or more computers. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices, micro processor-based or programmable consumer or industrial electronics, and the like. Aspects of these functions may also be practiced in distributed computing environments where tasks are performed by remote processing devices that are linked through a communications network. However, some aspects of the claimed subject matter can be practiced on stand-alone computers. In a distributed computing environment, program modules may be located in both local and remote memory storage devices. With reference to FIG. 10, an exemplary environment 176 for implementing various aspects disclosed herein includes a computer (e.g. desktop, laptop, server, hand-held, programmable consumer or industrial electronics). The computer includes a processing unit, a system memory, and a system bus. The system bus couples the system components including, but not limited to, system memory to the processing unit. The processing unit can be any of various available microprocessors. It is to be appreciated that dual microprocessors, multi-core and other multiprocessor architectures can be employed as the processing unit.

The system memory includes volatile and nonvolatile memory. The basic input/output system, containing the basic routines to transfer information between elements within the computer, such as during start-up, is stored in nonvolatile memory. By way of illustration, and not limitation, nonvolatile memory can include read-only memory (ROM). Volatile memory includes random access memory (RAM), which can act as external cache memory to facilitate processing.

Computers 176 also include removable/non-removable, volatile/nonvolatile computer storage media, for example mass storage. Mass storage includes, but is not limited to, devices such a magnetic or optical disk drive, floppy disk drive, flash memory or memory stick. In addition, mass storage can include storage media separately or in combination with other storage media.

Software applications may act as an intermediary between users and/or other computers and the basic computer resources 176, as described, in suitable operating environments. Such software applications include one or both of system and application software. System software can include an operating system, which can be stored on the mass storage, the acts to control and allocate resources of computer system 176. Application software takes advantage of the management of resources by system software through the program modules and data stored on either or both of the system memory and mass storage.

The computer also includes one or more interface components that are communicatively coupled through the bus and facilitate interaction with the computer. By way of example, the interface component can be a port (e.g., serial, parallel, PCMCIA, USB or FireWire) or an interface card, or the like. The interface component can receive input and provide output (wired or wirelessly). For instance, input can be received from devices including but not limited to a pointing device such as a mouse, trackball, stylus, touchpad, touch screen display, keyboard, microphone, joy stick, gamepad, satellite dish, scanner, camera, or other component. Output can also be supplied by computers 176 to output devices via the interface component. Output devices can include displays (e.g. cathode ray tubes (CRT), liquid crystal display (LCD), light emitting diodes (LED), plasma), whether touch screen or otherwise, speakers, printers, and other components. In particular, by such means, computers 176 was receive inputs from, and direct outputs to, the various components with which computers 176 communicate, as described herein.

A vacuum source 182 draws air through ducts 184 from platens 126 and 129. The vacuum is applied to surfaces 140 and 131 at small holes extending across the entirety of these surfaces. Once between the platens, metal or wooden spacers disposed between the platens, outside the panel, maintain the opposing platens spaced apart at a distance suitable for the panel.

In a still further embodiment, platen 126 has the same dimensions as platen 124, such that engagement surface 140 and engagement surface 127 are of the same shape and size, each being at least sufficiently large to encompass the major surface of the largest panel shell to be received by the press. Third platen 129 remains atop platen 126 in this embodiment, but on extensions which position third platen 129 slightly inward of platen 126. Platen 129, in this embodiment, pivots between a first position in which surface 131 faces downward, in the perspective of FIG. 10A, and a second position in which the platen pivots about an axis at the end of the extensions, in the counterclockwise direction, so that surface 131 is vertical, in the perspective of FIG. 10A, 90° offset from the first position. The width of surface 131 is shortened to be approximately equal to the width of the panel shell side members. In this embodiment, when engagement surfaces 127 and 140 engage and secure the two major panel sides (i.e. the facers), engagement face 131 engages and secures (for example, via suction) the top side member, which is separate from the one or more side members that encompass the three other panel sides. Computers 176 control pistons 146 to pivot third platen 129 counterclockwise, thereby moving the top side member away from the panel's interior volume and exposing the panel's interior volume to dispensing head 164 and its dispensing tip 166 (see moved-away portion 190, in FIG. 11). This embodiment may be particularly advantageous, for example, when the panel shell includes support posts that, unlike ribs 44 shown in FIG. 6, extend entirely between the inner and outer panel facers, thereby segmenting the panel's internal volume. Pulling a side member away, as opposed to bending open a top portion of the outer facer, may provide more direct access to the segmented volume interior, although it should be understood that an opening defined by one or more (subsequently plugged) through holes in the top facer portion may also provide sufficient access. (In a still further embodiment as described below, one or more through holes may be provided in the side member to allow pouring through the hole(s) and subsequent plugging of the hole(s).) Also, in such an embodiment, supports 144 may extend further upward and as shown in FIG. 10A, to accommodate a higher profile of platens 126 and 129. Correspondingly, opposing receiving locks 152 are disposed further above platen 124 on the press frame. This, in turn, moves rail system 168 further upward, and tip 166 of mixing head 164 may be accordingly elongated to reach a suitable position proximate the opening to the panel interior volume created when platen 129 moves the top side member away from the volume.

In operation, a liner panel shell 60/70 is constructed so that the facers and side members completely enclose the panel's interior volume, for example as described above with respect to FIGS. 6, 7, and 11. As noted herein, the present system and method can accommodate panels in which structure internal to the panel is attached to or otherwise interacts with one or both facers, thereby preventing the complete removal of a given facer to allow input of the foam agent. As should be apparent from the present disclosure, however, the presently described system may be used to input foam into panels in which internal structure does not attach to or otherwise interact with one or both facers. Also, the internal volume may comprise a continuous void, or it may be divided into segments, for example by J-shaped or Z-shaped structural posts with or without attached foam dams to create discrete volumes. Where the panel defines a continuous void, the void is exposed to the opening as discussed below so that an amount of foam agent may be poured into the void through the opening in a single linear movement of the dispensing head (whether continuous or intermittent, but without diverging movements) so that foam generated by the agent in the void completely fills the panel's interior volume. Where the volume is segmented, all segments may communicate with the opening so that the poured foam agent poured in a single movement of the dispensing head is sufficiently deposited into each segment so that, again, foam generated by the agent completely fills the panel's interior volume. Certain segments, however, for example a segment that will later be cut out of the panel to allow for another trailer structure such as a door, may be sealed from the opening so that foam generated by the foam agent only partially fills the panel's overall volume. In any event, in this described embodiment, panel 60/70 is constructed so that (a) there are no attachments or other interactions between the panel's interior structure (if any) and at least one of the two facers (or between such interior structure and the top-oriented side member, as described above with respect to the second embodiment) along the entirety of one the edges of the panel at the interface with the volume such that an opening of the panel at that edge exposes the entirety of the panel interior volume for input of the foam agent, (b) this condition exists from that edge for a distance at least equal to the depths (i.e. the vertical length, as shown in FIG. 10A) of platen face 131, and (c) the relevant facer is flexible over the bending range of third platen 129. In the example discussed above with respect to FIG. 6, these conditions exist with respect to the polymer inner facer of panel shell 60 along the longitudinal edge on the side adjacent the top rail, as indicated schematically at 190 in FIG. 11. With regard to the example discussed at FIG. 7, these conditions exist with the polymer inner facer, along the longitudinal edge of the panel further from the light fixture and the conduit track.

As noted above, upon the panel shell's assembly, clamps are placed along this edge both to hold the shell together at that edge and to provide points of attachment of the bridge crane's carrying lines. When the crane lifts the panel, this panel edge therefore faces upward, and the crane conveys the panel to press 116 in such orientation. The crane moves the panel into either sub-press 120 or 122 (which is in the open state, as shown in FIG. 10A at press 122). The crane orients the panel so that the aluminum outer facer faces platen face 127, the polymer facer faces platens 126 and 129, and the longitudinal panel edge facing upward is aligned parallel to and even with the top longitudinal edge of platen 129. Since the platen top edge is aligned at a constant distance from the dispensing head's travel rail, i.e. at a constant distance from the dispensing head's travel path, this aligns the panel's top edge (and the length of opening 192, as shown in FIGS. 10A and 11) at a constant distance from the dispensing head's travel path. An operator 186 actuates a computer control system 176 associated with the appropriate sub-press so as to move platen 126 toward platen 124, sandwiching the panel shell between platens 124 and 126 (and 129), with metal or wooden spacers disposed between the platens outside the panel shell to maintain the platens apart from each other at a distance appropriate for the panel. Control system 126 actuates vacuum system 182 to draw a vacuum from platen 126 and 129, thereby drawing air through holes in face 140 and 131 and through duct 184. As the panel shell, and more particularly the polymer-side facer, is brought into contact with platen faces 140 and 131, this negative pressure secures the panel to the platen.

At this point, platen 126 is in a position away from platen 124, as indicated on the left side of FIG. 10A. Hydraulic arms 146 are extended, so that platen 129 is pivoted forward about axis 132 and platen surfaces 140 and 131 are coplanar. From such conditions, control computer 176 operates a hydraulic pump (not shown) to drive hydraulic pistons 132 to expand, thereby moving platens 126 and 129 toward platen 124 so that platen surfaces 140 and 131 engage polymer liner facer 188. Lock arms 148 are in the withdrawn position, as shown on the right side of FIG. 10A. Computer control system 176 actuates vacuum source 182 to apply negative pressure to the holes in engagement face 131 of third platen 129, and optionally to the holes in engagement surface 140. Referring also to FIG. 11, which schematically illustrate a panel 60/70 in absence of the platen, for ease of explanation, this causes face 131 to secure the free upper edge portion 190 of panel shell 60/70. Computer control system 176 then actuates the hydraulic system to close hydraulic arms 146, thereby pivoting platen 129 away from the plane of the panel, and more specifically bending a portion 190 of polymer inner facer 191 away from the panel plane (and away from the main portion of the facer and from long side member 34*d* and short side members 34*a* and 34*c*, overcoming the adhesion of the foam tape between the facer and the side members), thereby creating an opening 192 between the panel shell's internal volume 42 and the area 193 exterior to the panel shell. This opening runs the entire length 195 of volume 42 along the panel's upward-facing longitudinal edge. Still referring to FIG. 11, a second long-side side member 34*c* is not visible in the Figure but is a mirror image of side member 34*d*. The side members and the facers (when facer portion 190 is moved back into engagement with side members 34*a*, 34*b* and 34*d*) enclose volume 42.

Computer system 176 controls the motorized carriage supporting mixing head 164 to move the foam agent mixing head along rail 168 to one extreme end of opening 192. Computer system 176 controls pumps 160 and 162 to deliver polyol and isocyanate to mixing head 164, so that these components mix in the mixing head and are poured out of mixing tip 166 through opening 192 and into the panel shell's interior volume. Computer system 176 simultaneously actuates the motorized carriage that supports the mixing head to thereby drive the mixing head down rail system 168, propelling the mixing head along the rail at a predetermined speed (which may be continuous or intermittent, for example to accommodate discrete voids in the panel volume) along opening 192, the mixing head pouring foam agent through the opening at a predetermined rate (which may also be continuous or intermittent, for example to accommodate variations in the panel's internal volume) and into the panel shell volume. Whether continuous or intermittent, the dispensing head moves along a path that is offset from and corresponds to the shell's periphery (in this example, a single linear movement, in that the shell's sides are linear), i.e. the dispensing head moves in a path having a substantially constant offset from the panel periphery so that the path corresponds to the panel periphery, without diverging from that path, as the dispensing head pours all of the foam agent needed for the finished panel. This single-type movement improves operational speed over systems requiring diverging movements to engage and subsequently plug injection access holes.

The movement down the rail and the rate of pouring and flow from mixing head 164 determines the volume of liquid foam agent deposited per unit length of opening 192 into the panel shell interior volume. These parameters, and the chemistry of the liquid foam agent (specifically, the polyol) are chosen so that a sufficient amount of liquid foam agent is deposited into the panel interior volume, across the continuous or sectioned cross-sectional area of that volume, so that foam expanding from the deposited foam agent completely fills the intended portion of the panel shell's interior volume but does not generally begin expanding until foam mixing head 164 completes the deposition of foaming agent into the panel shell.

The particular speed at which the foam depositing head moves, the rate at which the foam depositing head deposits liquid foam agent, and the liquid foam agent chemistry, can be selected as desired by the user to accommodate the particular volume of the sandwich liner panel shell being foamed. Since the panel's volume characteristics are known beforehand, then computer system 176 can be programmed to control the system accordingly. In particular, as the vertical cross-section (perpendicular to the planes of the facers) changes, when considered moving along the length of opening 192, the rate (continuous or intermittent) at which liquid foam agent is deposited from foam mixing head 164 into the panel shell interior volume may also vary accordingly.

As mixing head 164 moves along rail 168 past successive lock rods 148, control computer system 176 actuates each lock rod's drive mechanism 150 to close the respective lock rod 148 behind the liquid foam mixing head as the mixing head passes by, so that the respective rod's threaded lock end 152 threadably or otherwise engages its locking head 154. When mixing head 164 reaches the end of opening 192, therefore, all locking rods 148 are engaged. At this point, computer system 176 actuates the hydraulic system to expand hydraulic pistons 146, thereby pivoting platen 129 back to its flush position, so that platen faces 140 and 131 are again co-planar, and polymer liner portion 190 again engages the panel shell side members, thereby again enclosing the panel shell interior volume. Computer system 176 then actuates drive system 150 to pull platen 126 toward platen 124, thereby applying pressure to the opposing facers of the panel. The deposited foam agent expands within the panel interior, forcing gases and air within the enclosed volume to escape through the vents. Computer system 176 also controls operation of the chiller and pumps 178 and 180 to circulate fluid through the platens as the foam exotherms. The press remains in this condition for a time sufficient for the foam to fully expand and subsequently cure. After this time, computer system 176 disconnects and withdraws lock rods 148 from their opposing locking heads 154, and contracts hydraulic pistons 132 to draw platens 126 and 129 away from platen 124. The bridge crane then removes the panel from the press.

The embodiments described herein provide a panel shell with an opening having a dimension in the dispenser's direction of movement that is sufficient, given the dispenser's (continuous or intermittent) speed and (continuous or intermittent) rate of depositing foam agent, to dispense an amount of foam agent that is sufficient to generate the entire amount of foam needed for the panel in its final condition as assembled into a trailer or other structure. The opening may be made in any surface of the panel shell, and can be made, for example, by pulling or bending away part of the panel shell surface (see portion 190 in FIG. 11) from the remaining panel shell surface, as described above, or by opening a through hole(s) in any of these surfaces that is/are then plugged, that provide(s) access to that portion of the panel shell interior volume that is to be foamed or otherwise filled with an expanding core material. Consider, for example with regard to the schematic illustration of FIG. 11, a rectangular prism type panel such as described above, in which the panel shell's circumferential periphery is defined by the one or more side members (34a-34d in FIG. 11). Where the opening comprises one or more discrete holes, for example, the opening may extend on or offset from the panel's circumferential periphery (i.e., on one or more of the side members or on a facer, depending on the panel and the configuration of the press). If the opening comprises a single hole, the hole opens to the panel volume's single continuous void or to all discrete voids which are to be filled with foam. Similarly, if the opening comprises multiple holes, the set of holes collectively opens to the panel volume's single continuous void or to all discrete voids which are to be filled with foam. The opening (i.e. the single or multiple holes) is aligned proximate to and along the dispensing head's path of travel (e.g. parallel to distance 195, as shown in FIG. 11, and into and out of the page from the perspective of FIG. 10A), so that as the dispensing head moves along its path of travel and dispenses foam agent into the opening, the dispensing head dispenses foam agent through the opening and into the volume in a movement of the dispensing head along a path that corresponds to the panel shell periphery, without need to diverge from that path. As discussed above, since the panel interior's total volume, dimensions and configuration are known, the control system can be, and is, programmed to dispense an amount of foam agent into the opening so that the foam generated by the then-deposited foam agent fills all or an intended portion of volume 42 in the final panel. Still referring to FIG. 11, for example, assume that portion 190 is not pulled away from side members 34a, 34b, and 34c, so that the two facers and the four side members enclose volume 42. A through hole (shown in phantom at 197, which may be omitted in an embodiment in which portion 190 is pulled away from the remainder of the shell in order to define the opening) formed through side member 34d has a dimension in the direction of distance 195 that is, as illustrated, less than (and, e.g., approximately 40% of) distance 195, but opening 197 nonetheless communicates with a single void that comprises volume 42 or, if volume 42 is segmented, with all such segments that are to be foamed in the finished panel. Thus, as the dispensing head moves along its path of travel in the direction indicated by distance 195, along the length of elongated hole 197, dispensing foam agent through the hole into the volume in response to the pre-programmed control system, the dispensing head dispenses sufficient foam agent into the volume so that the resulting foam fills all or the intended portion of volume 42. Hole 197 could also comprise multiple, discrete holes spaced apart over distance 195 but nonetheless opening to volume 42 (again, which may be a continuous void or the sum of a plurality of discrete voids) so that when the dispensing head moves (again, under the control system's control) at its predetermined (in this case intermittent, hole-to-hole) speed in a single movement and dispenses foam agent intermittently at each hole, the resulting foam agent deposited into volume 42 is sufficient in amount and disposition within volume 42 so that the resulting foam fills all or the intended portion of volume 42 in the finished panel. After the dispensing head dispenses foam agent, the control system may automatically plug the hole, e.g. via a robotic member or (where the hole is formed by removal of side member 34d) by replacement of the side member by a press platen. Thus, it will be apparent that hole 197 may extend the entire distance 195 or some portion thereof, as appropriate in view of the volume and configuration of volume 42, the rate of deposition of foam agent from the dispensing head, and the speed at which the dispensing head moves along its path of travel (see 195). Still further, portion 190 may be bent away from the remaining portion of the shell over a distance less than the entire length of the panel edge. In one embodiment, hole 197 or opening 192 has a distance in or parallel to the circumferential peripheral dimension that is at least about 2%, and in embodiments about 5%-25% or about 5%-40% of the total circumferential direction (i.e. the lengths of side members 34a-34d in the FIG. 11 embodiment), or at least about 6%, and in embodiments about 15%-75% or about 10%-100% or about 50%-100% of the total length of one of the panel's longitudinal side portions (e.g. the length of side member 34d, or distance 195). The through hole should extend a sufficient distance to provide access to all volume segments or cavities that are to receive the core agent. For example, where foam dams are used in the panel, the dams may be spaced apart by distances of, e.g., four feet, eight feet, or sixteen feet, depending on the complexity of the structural arrangements in the cavities. Thus, hole 197 may extend the entire length of distance 195, or may be formed by the removal of side member 34d.

Further, it should be understood that variations in the press and panel may be made from the particular embodiments discussed herein. Referring to FIG. 10D, for example, platens 124 and 129 are held in part by opposing side brackets 199 (one of which is shown in FIG. 10D, which provides a back stop against rearward movement of platen face 131 with respect to platen face 140. Moreover, it should be understood that the apparatus and methods described herein may be used to form core-filled sandwich objects for uses other than structural panels. Thus, the panel-type object described herein is provided for purposes of example only, and it should be understood that various other object structures and configurations, and corresponding press configurations for accommodating such object structures, fall within the scope of the present disclosure.

Figure 12:
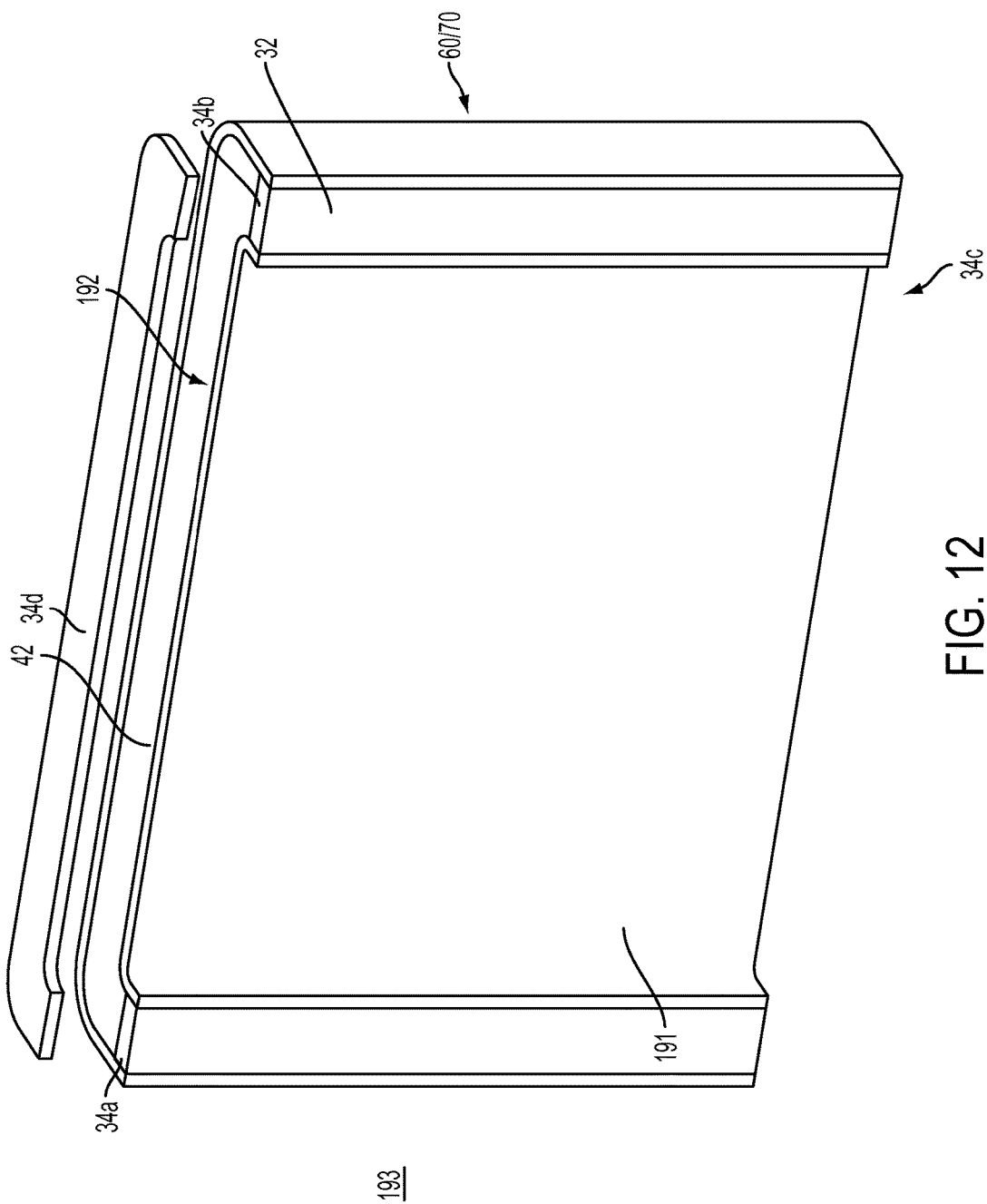
FIG. 12 is a schematic illustration of a panel shell for use with a press and method according to an embodiment of the present invention.

Also, it should be understood that while the examples discussed above disclose the use of planar panels, non-planar shaped panels could also be used. For example, as noted above and referring to FIG. 12, front panels for trailers can be constructed in accordance with an embodiment of the present invention. As should be understood, a front panel 60/70 may have a generally planar central portion and two curved sides, which bend around from the central portion to meet and attach to respective side panels. In such a panel, the central portion is constructed as discussed above, with general planar, opposing facers (as illustrated in FIG. 11). At each side, however, curved facers are discrete from and attached to planar facers in the central portion, or are formed unitarily with the central portion facers, so that the sides curve and define curved sides of the internal volume 42 therebetween. Similar to the side and roof panels, the panel shell's periphery is bounded by one or more side members 34a-34d. The press platens are correspondingly curved, so that the curved panel is received between the curved platens, which apply pressure that resists the pressure from foam expanding in the volume. In one embodiment, the press includes a top platen that secures the top side member 34d by suction and removes the top side member from the remainder of the shell, thereby exposing the curved interior volume 42 to the automatically movable dispensing head at an opening 192. The press frame is disposed so that the rail upon which the dispensing head travels corresponds to the volume's curved profile. When the operator activates the control system to start the dispensing process, the dispensing head moves along the curved path (again, in a movement that travels along a path offset from and corresponding to the opening, without divergence from the path), depositing the amount of foam agent needed to provide the panel's foam in finished form, after which the top platen returns top side member 34d into position in the panel shell, thereby once again enclosing volume 42. The side platens then are pulled and pushed toward each other by a series of lock arms and hydraulic pistons, to resist the pressure of the now-expanding foam. In a further embodiment, where the inner facer of the panel's generally planar central portion is separate from respective portions of the inner facer that form the curved parts of the inner facer, an independently pivotable central portion of the press platen secures the top part of the generally planar central portion of inner facer 191 and bends the top part away from the remainder of the panel shell, as shown with regard to portion 190 in FIG. 11, to thereby create an opening between interior volume 192 and exterior area 193.

Modifications and variations to the particular embodiments of present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A method of making a sandwich structure enclosing an amount of a core material generated by an expanded agent material, comprising:
    providing a shell that encloses a volume;
    providing a press having a plurality of platens and having a frame and a control system;
    providing a dispenser movable on the frame responsively to the control system at a predetermined speed and operable to dispense an amount of the agent material at a predetermined rate;
    disposing the shell within the press so that the platens secure the shell in a position;
    providing an opening in the shell sufficient so that a pour of the agent material into the volume through the opening at the predetermined rate made by the dispenser while moving at the predetermined speed deposits an amount of agent material into the volume that is sufficient to generate the entire said amount of core material; and
    moving the dispenser proximate the opening while causing the dispenser to dispense the sufficient amount of agent material into the volume through the opening.

2. The method as in claim 1, wherein the shell is a generally rectangular prism.

3. The method as in claim 1, wherein the shell comprises a first generally planar facer, a second generally planar facer spaced apart from the first facer, and at least one side member extending between the first facer and the second facer about a circumferential periphery of the shell so that the first facer, the second facer, and the at least one side member enclose the volume.

4. A method of making a sandwich structure enclosing an amount of a core material generated by an expanded agent material, comprising:
    providing a shell comprising a first facer, a second facer spaced apart from the first facer, and at least one side member extending between the first facer and the second facer about a circumferential periphery of the shell so that the first facer, the second facer, and the at least one side member enclose a volume;
    providing an opening
        in at least one of the first facer, the second facer, and the at least one side member, or
        between the at least one side member and at least one of the first facer and the second facer,
        at or generally parallel to a seam between the at least one side member and one of the first facer and the second facer and extending a distance of at least about 2% of the entire length of the circumferential periphery; and
    providing a movable dispenser proximate the opening and moving the dispenser across at least a portion of the opening, while causing the dispenser to dispense an amount of the agent material into the volume through the opening that is sufficient to generate the entire said amount of core material.

5. The method as in claim 4, wherein the periphery includes at least one generally linear portion, and wherein the distance is at least about 10% of an entire length of the volume at a said generally linear portion of the circumferential periphery.

6. The method as in claim 5, wherein the periphery includes four said generally linear portions, and wherein the distance is at least about 10% of the entire length of the volume at one of said generally linear portions of the circumferential periphery.

7. A method of making a sandwich panel enclosing an amount of foam, comprising:
    providing a panel shell comprising
        a first generally planar facer,
        a second generally planar facer generally parallel to and spaced apart from the first facer, and at least one side member extending between the first facer and the second facer so that the first facer, the second facer, and the at least one side member enclose a volume;

moving at least one of
- a portion of at least one of the first facer and the second facer with respect to a respective remainder of the at least one of the first facer and the second facer, and
- the at least one side member away from the volume, thereby defining an opening between the volume and an area exterior to the panel shell;

providing a movable dispenser proximate the opening and moving a dispenser across at least a portion of the opening, while causing the dispenser to dispense an amount of a foam agent into the volume through the opening that is sufficient to generate the entire said amount of foam in the volume; and after causing the dispenser to dispense the sufficient amount, moving the at least one of the portion and the at least one side member to a position in communication with at least one other of the first facer, the second facer, and the at least one side member to thereby close the opening and enclose the volume.

8. The method as in claim 7, comprising, following the first providing step and prior to the first moving step, inserting the panel shell between opposing platens of a press, so that the first facer abuts a first platen and the second facer abuts a second platen.

9. The method as in claim 7, wherein the panel shell forms a generally rectangular prism, wherein the first facer is a major side of the rectangular prism and the second facer is a major side of the generally rectangular prism.

10. The method as in claim 9, wherein the at least one side member comprises four generally rectangular sections.

11. The method as in claim 10, wherein the opening extends an entire length of the volume at one of the four generally rectangular sections.

12. The method as in claim 7, wherein the first moving step comprises moving the portion and wherein the step of moving the portion comprises bending the portion with respect to the respective remainder.

13. The method as in claim 8,
wherein the inserting step comprises inserting the panel shell between opposing first and second platens that define planar surfaces that receive respective ones of the first facer and the second facer, and
wherein the press comprises a third platen that is movable with respect to the first platen and the second platen, and
further comprising the step of securing the at least one of the portion and the at least one side member to the third platen, wherein the first moving step comprises moving the third platen with respect to the first platen and the second platen and away from the volume.

14. The method as in claim 7, wherein the foam is an insulating foam.

15. The method as in claim 7, wherein the first providing step comprises providing a said panel shell wherein the volume is defined by a continuous void.

16. The method as in claim 7, wherein the first providing step comprises providing a said panel shell wherein the volume comprises a plurality of discrete voids separated by respective structures extending between the first facer and the second facer, and wherein, following the first moving step, each of the discrete voids is in fluid communication with the opening so that each of the voids receives the foam agent at the causing step.

17. The method as in claim 7, wherein the first providing step comprises providing a structure within the volume extending between the first facer and the second facer.

18. The method as in claim 17, wherein, in the first providing step, each of the first facer and the second facer is generally rectangular in shape, and the first facer and the second facer are spaced apart from each other so that their respective longitudinal axes are parallel to each other, and wherein, in the structure providing step, the structure comprises a plurality of elongated metal posts respectively disposed so that longitudinal axes of the metal posts are transverse to the respective longitudinal axes of the first facer and the second facer.

19. A method of making a sandwich panel enclosing an amount of foam, comprising:
providing a panel shell comprising
  a first generally planar facer,
  a second generally planar facer generally parallel to and spaced apart from the first facer, and
  at least one side member extending between the first facer and the second facer so that the first facer, the second facer, and the at least one side member enclose a volume, and wherein the panel shell forms a generally rectangular prism;
inserting the panel shell between opposing platens of a press, so that the first facer abuts a first platen and the second facer abuts a second platen, wherein the press comprises a third platen that is pivotable with respect to the first platen;
securing a portion of the first facer to the third platen;
pivoting the third platen with respect to the first platen, thereby moving the portion of the first facer to a first position away from a portion of the at least one side member and defining an opening between the volume and an area exterior to the panel shell, wherein the opening has a first end and a second end opposite the first end;
providing a movable foam dispenser proximate the opening and moving the foam dispenser between the first end and the second end, while causing the foam dispenser to dispense an amount of a foam agent into the volume through the opening that is sufficient to generate the entire said amount of foam; and
after causing the foam dispenser to dispense the sufficient amount, moving the portion of the first facer to a second position in communication with the at least one side member to thereby close the opening and enclose the volume.

20. The method as in claim 19, wherein the at least one side member comprises four generally rectangular sections.

21. The method as in claim 20, wherein the opening extends an entire length of the volume at one of the rectangular sections.

* * * * *